United States Patent [19]

Whitney et al.

[11] Patent Number: 5,796,834
[45] Date of Patent: Aug. 18, 1998

[54] SYSTEM AND METHOD FOR CONTROLLING THE DISPENSING OF AN AUTHENTICATING INDICIA

[75] Inventors: Jonathan W. Whitney; David M. Gressett; Salim G. Kara, all of Houston, Tex.

[73] Assignee: E-Stamp Corporation, Houston, Tex.

[21] Appl. No.: 812,803

[22] Filed: Mar. 6, 1997

Related U.S. Application Data

[63] Continuation of Ser. No. 51,601, Aug. 16, 1995, which is a continuation-in-part of Ser. No. 263,751, Jun. 22, 1994, Pat. No. 5,606,507, which is a continuation-in-part of Ser. No. 176,716, Jan. 3, 1994, Pat. No. 5,510,992.

[51] Int. Cl.[6] .............................. H04K 1/00; G06F 17/00; H04L 9/00
[52] U.S. Cl. .............................. 380/25; 705/44; 705/401; 705/405; 705/408; 705/411; 380/51
[58] Field of Search .................. 380/51, 25; 364/464.18, 364/464.21, 464.12; 705/401, 44, 408, 405, 411

[56] References Cited

U.S. PATENT DOCUMENTS

| 4,575,621 | 3/1986 | Dreifus ............................ 235/380 |
| 4,641,347 | 2/1987 | Clark et al. ...................... 380/3 |
| 4,725,718 | 2/1988 | Sansone et al. ................. 235/495 |
| 4,743,747 | 5/1988 | Fougere et al. ................. 235/494 |
| 4,757,537 | 7/1988 | Edelmann ........................ 380/51 |
| 4,763,271 | 8/1988 | Field ............................... 364/466 |
| 4,775,246 | 10/1988 | Edelmann et al. ............. 380/23 |
| 4,800,506 | 1/1989 | Axelrod et al. ................. 364/478 |
| 4,802,218 | 1/1989 | Wright et al. ................... 380/23 |
| 4,812,994 | 3/1989 | Taylor et al. ................... 364/464.02 |
| 4,831,555 | 5/1989 | Sansone et al. ................ 364/519 |
| 4,864,618 | 9/1989 | Wright et al. .................. 380/51 |
| 4,868,757 | 9/1989 | Gil .................................. 364/464.03 |
| 4,900,903 | 2/1990 | Wright et al. .................. 235/380 |
| 4,900,904 | 2/1990 | Wright et al. .................. 235/381 |
| 4,901,241 | 2/1990 | Schneck ......................... 364/464.02 |
| 5,065,000 | 11/1991 | Pusic .............................. 235/381 |
| 5,111,030 | 5/1992 | Brasington et al. ........... 235/375 |
| 5,239,168 | 8/1993 | Durst, Jr. et al. ............. 235/432 |
| 5,319,562 | 6/1994 | Whitehouse ................... 364/464.03 |
| 5,390,251 | 2/1995 | Pastor et al. .................. 380/21 |
| 5,544,246 | 8/1996 | Mandelbaum et al. ....... 380/23 |

FOREIGN PATENT DOCUMENTS

| 0137737 | 4/1985 | European Pat. Off. . |
| 2580844 | 10/1986 | France . |
| 225121 | 7/1992 | United Kingdom . |
| WO8801818 | 3/1988 | WIPO . |

*Primary Examiner*—Stephen C. Buczinski
*Attorney, Agent, or Firm*—Fulbright & Jaworski L.L.P.

[57] ABSTRACT

There is disclosed a system and method for dispensing postage (or other graphical security indicia) electronically by using a portable processor containing a maximum amount of preauthorized postage which can be applied to any piece of mail. The portable processor can be refilled at various locations through the use of a closed-loop system which relies upon a database of users who are preregistered in the database. Upon refill of the portable processor an expiration date is stored therein. Thereafter, each transaction includes reference to this expiration date and a secure realtime clock in order to determine if the portable processor may dispense postage. Additionally, the realtime clock is utilized to provide date stamping of the indicia generated.

41 Claims, 23 Drawing Sheets

Post N Mail, Inc.  
505 Cypress Station Dr. Suite # 505  Telephone (713)583-8909  Fax (713)699-0101
Houston, Tx 77030-1612

"E-Stamp"™ - Registration form

31 — T.M.U. Button Serial #000000001     Date: April 20, 1994  ⎤
32 — E-Stamp Serial     #000000001     Time: 01:29 AM         ⎦ 33

35 ⎧ Registered user:
   ⎪ Individual      Salim G. Kara       Social Security # 636-18-0137
   ⎪ Organization    Global Impex, Inc.  Employer I.N. # 76-0422781
   ⎨ Address:        505 Cypress Station Dr.
   ⎪                 Suite #505
   ⎪ City:           Houston    State: Tx    Zipcode+4: 77090-1612
   ⎩ Telephone: (713)583-8909   Fax: (713)699-0101

Post N Mail License Agreement

38 ⎧ This is a legal agreement between you (an individual or an entity), the end user, and
   ⎪ Post N Mail, Inc. If you do not agree to the terms of this Agreement, promptly return
   ⎪ the disk package and accompanying items (including all hardware, written materials and
   ⎪ binders or other containers) to the place you obtained them for a full refund.
   ⎪ License
   ⎨ 1. Grant of License.
   ⎪ 2. Term of License.
   ⎪ 3. Copyright.
   ⎪ 4. Other restrictions.
   ⎪ 5. Limited warranty.
   ⎪ 6. Customer remedies.
   ⎪ 7. No Other Warranties.
   ⎩ 8. No Liability for Consequential Damages.

_____308_____
Signature

*FIG. 3A*

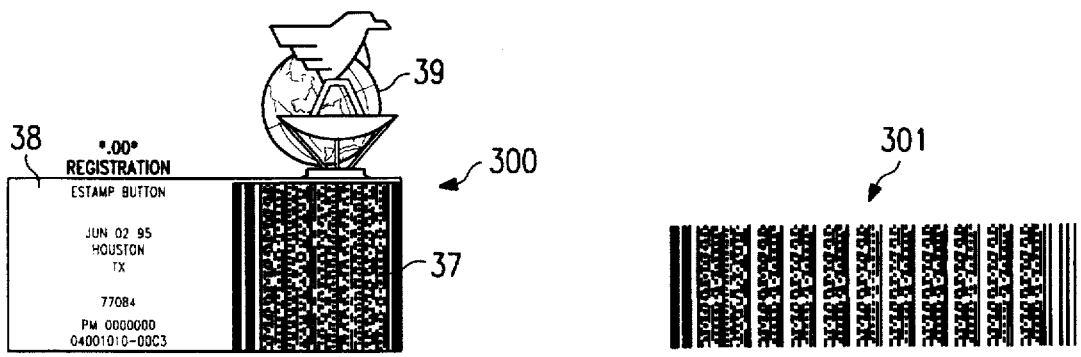

*FIG. 3B*

*FIG. 3C*

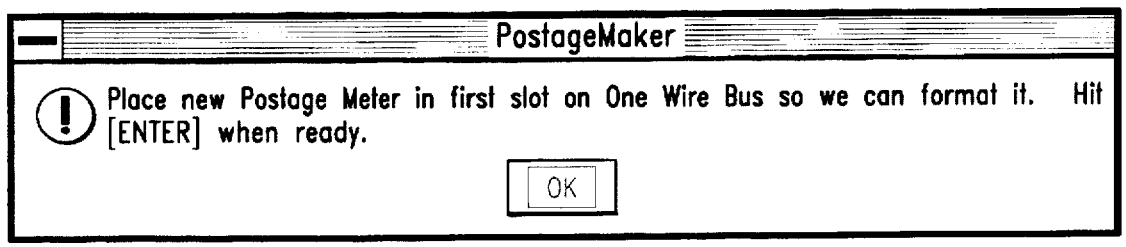

*FIG. 4H*

```
RECEIPT                    RECEIPT NO:              AG7654321
POSTAGE BUTTON REFILL SERVICES                           5/25
TRANSACTION:
   AUTHORIZATION CODE: MA1234567    TRANSACTION DATE: 5/25/95
                                    TRANSACTION TYPE: INITIALIZE
                                    TRANSACTION AMOUNT:    2.00
POSTAGE BUTTON:
       SERIAL NO: 0800101000E0              OWNER:
                                       OWNER ZIP CODE:
                                    TRANSACTION COUNTER: 00
                              REMAINING CREDIT BALANCE:    2.00
```

*FIG. 4I*

Add Postage to a Button

Button information
- Button Serial No.: 0800101000E0
- PNM Registration No.:
- Last Access On: 05/25/95
- Remaining Balance: $2.00
- Name:
- Zip Code:
- Expires On: 08/23/95

Add Postage
- Current Balance: $2.00
- Transaction Balance: 100

Button Refill Information
- Refill Date: 05/25/95
- Site ID: 000001
- Refill Balance:
- Refill Time: 12:37 PM
- Workstation 1

[ OK ]  [ Accept ]  [ Re-Enter ]  [ Cancel ]

*FIG. 4J*

Add Postage to a Button

Button information
- Button Serial No.: 0800101000E0
- Name: Paul Alto
- PNM Registration No.:
- Zip Code: 77026-4217
- Last Access On: 05/25/95
- Expires On: 08/23/95
- Remaining Balance: $2.00

Add Postage
- Current Balance: $102.09
- Transaction Balance: [ ]

Button Refill Information
- Refill Date: 05/25/95
- Refill Time: 12:37 PM
- Site ID: 000001
- Workstation 1
- Refill Balance:

[ OK ]  [ Accept ]  [ Re-Enter ]  [ Cancel ]

*FIG. 4K*

Add Postage to a Button

Button information
- Button Serial No.: 0800101000E0
- Name:
- PNM Registration No.:
- Zip Code:
- Last Access On: 05/25/95
- Expires On: 08/23/95
- Remaining Balance: $2.00

Add Postage
- Current Balance: $2.00
- Transaction Balance: 100

Button Refill Information
- Refill Date: 05/25/95
- Refill Time: 12:37 PM
- Site ID: 000001
- Workstation 1
- Refill Balance: $102.00

[ OK ]  [ Accept ]  [ Re-Enter ]  [ Cancel ]

*FIG. 4L*

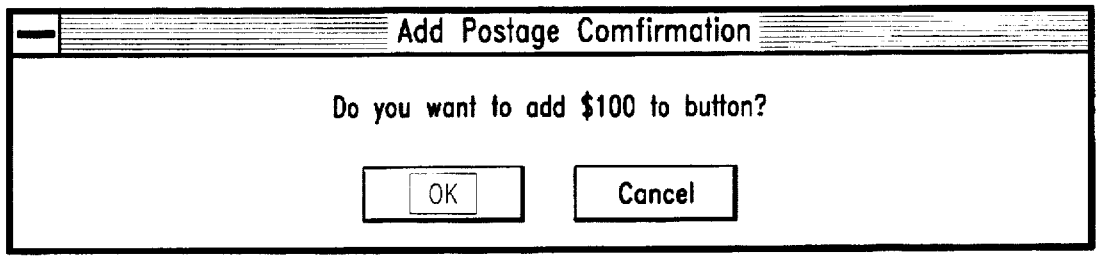
FIG. 4M
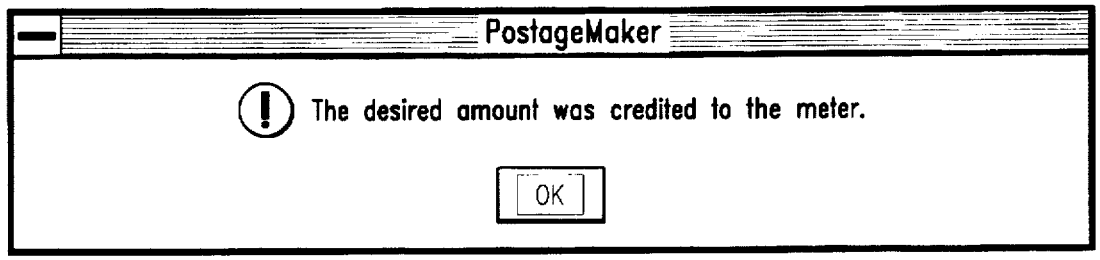
FIG. 4N
| RECEIPT | RECEIPT NO: | AG7654321 |
|---|---|---|
| POSTAGE BUTTON REFILL SERVICES | | 5/25 |
TRANSACTION:
AUTHORIZATION CODE: MA1234567    TRANSACTION DATE: 5/25/95
　　　　　　　　　　　　　　　　　TRANSACTION TYPE: CREDIT
　　　　　　　　　　　　　　　　　TRANSACTION AMOUNT:　　　　100.00
POSTAGE BUTTON:
　　　SERIAL NO: 0800101000E0　　　　OWNER:
　　　　　　　　　　　　　　　OWNER ZIP CODE:
　　　　　　　　　　　　　TRANSACTION COUNTER: 01
　　　　　　　　　　　　　REMAINING CREDIT BALANCE:　　　102.00
FIG. 4O

E-Stamp-(Database)

File Safely Layout Record Help

Background On
✓ Background Off

Print...                Ctrl+P
Print Preview
Print Setup...

Verify Addresses

Connect Other Data...

Import Yellow
Export Yellow
Import White
Export White

View Log file
Print Log file
Print Preview Log File

Exit

☐ Do not print

Address To

Name: XXX         X

Company: X

Address 1: X

Address 2: X

City: XX

State: JH

Zipcode: X           ☐ Address Verified

Country:

Phone: (    )        Fax: (    )

⊙ to right          Font    Save
○ above

Zip: 77001

Fonts        Save

Add          Delete

Mail

Pounds    Ounces

Weight:  0          1

Zone: LOCAL

Class: FIRST

Button Status

Amount Remaining:
$1001.680

Button OK.

Postage

Calculated
$0.320

☐ Manual 12 of 37    05/24/95    04:32PM

E-Stamp (Business)

FIG. 9

E-Stamp-(Envelope)

File  Edit  View  Help

James Jones
Jones & Smith
100 S. Main
M.S. 202
Houston, TX 77001

903 — Walter Friedrich
Star-Byte, Inc.
2880 Bergey Road
Hatfield, PA  19440

38

*.32*
U.S. POSTAGE
FIRST CLASS
JUN 02 95
HOUSTON
TX
77084
PM 0000000
04001010-00C3

300
39
37

E-Stamp (Business)    13 of 37    05/24/95    04:34PM

For Help press F1

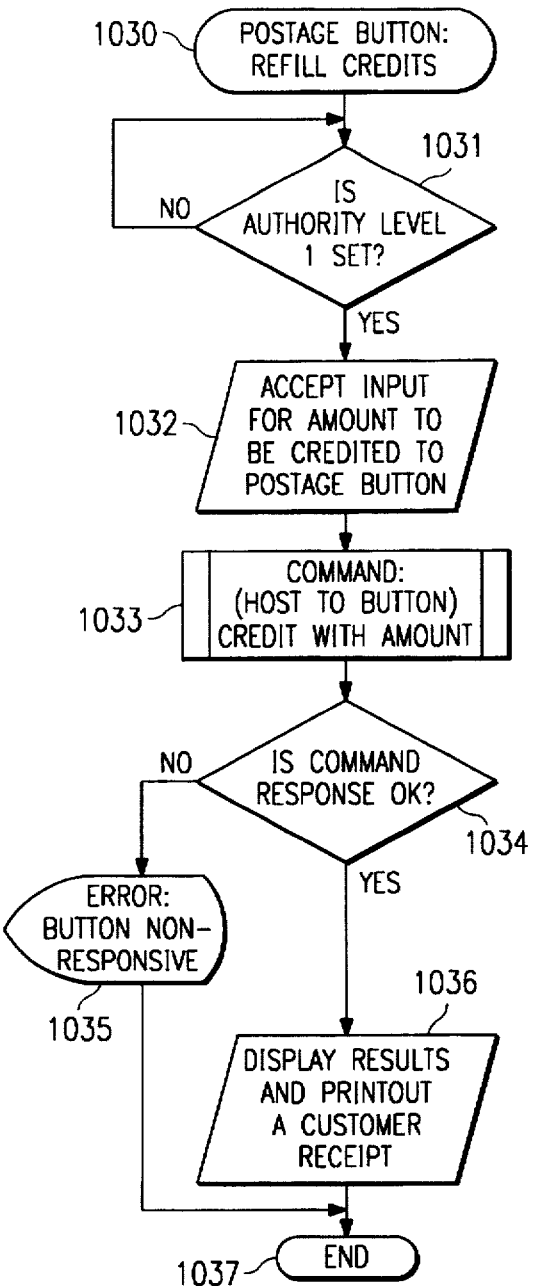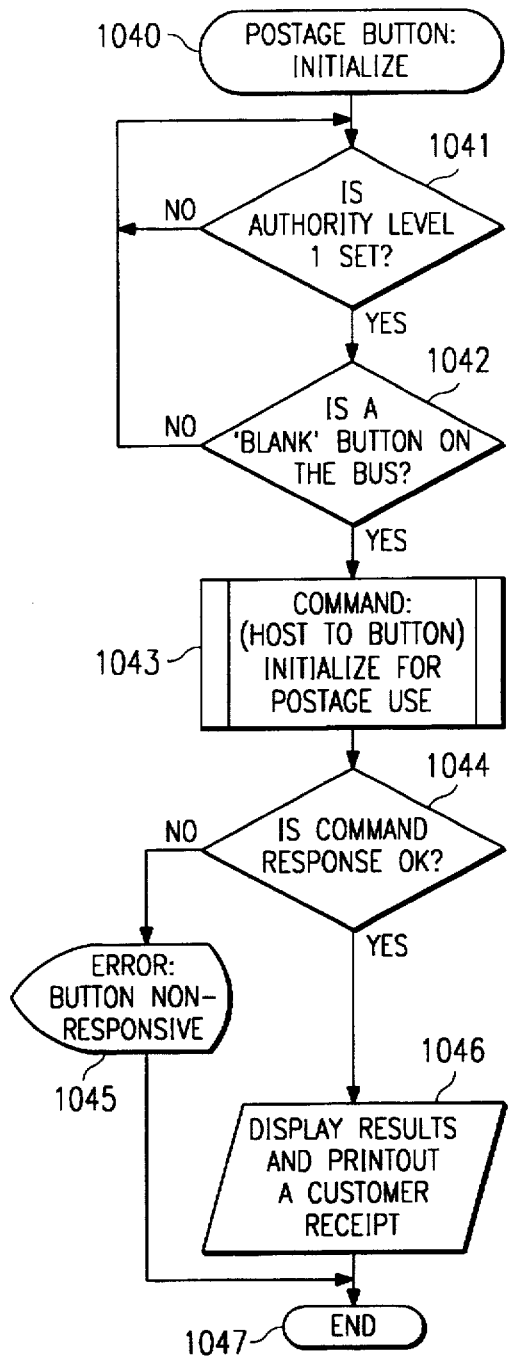
FIG. 10C
FIG. 10D

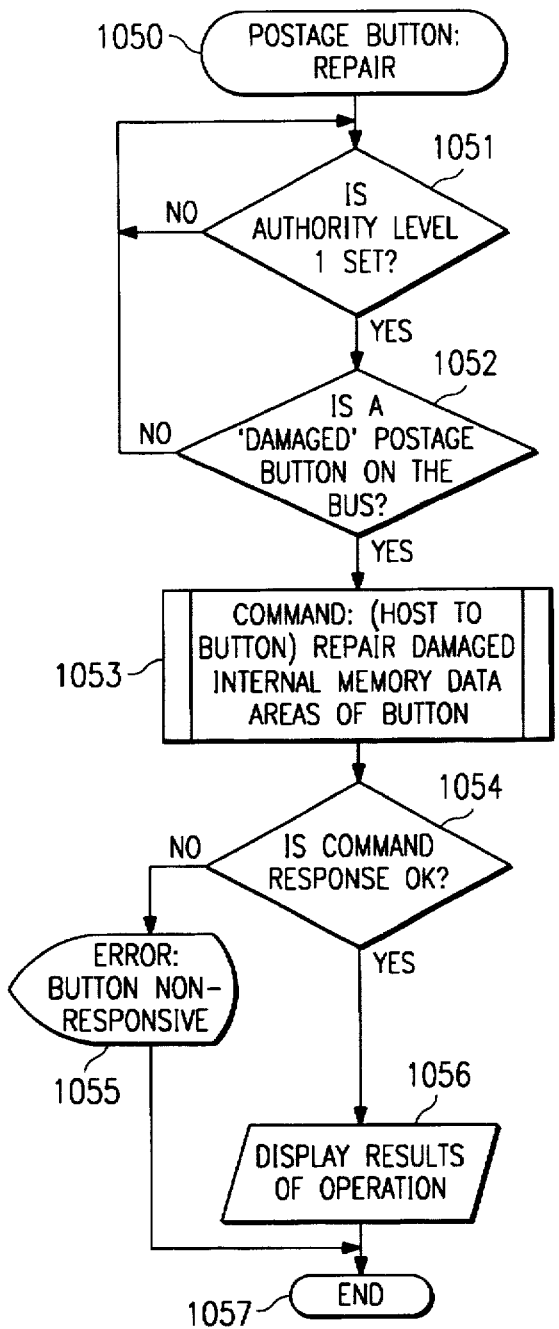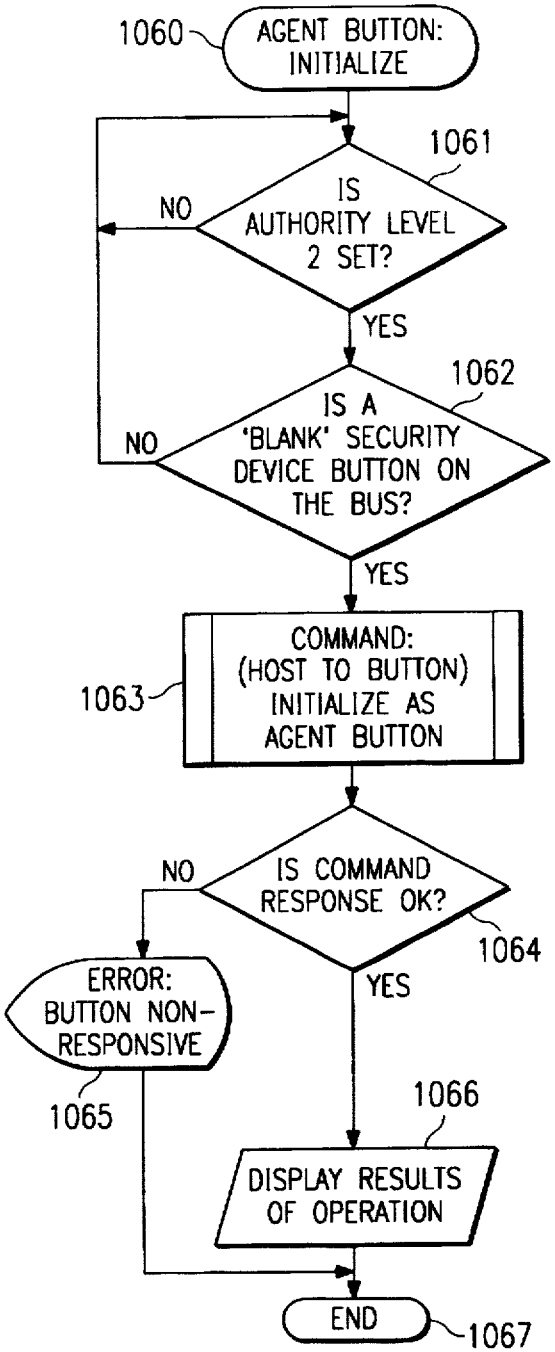
FIG. 10E
FIG. 10F

BLOCK DIAGRAM OF MEMORY LAYOUT FOR PREFERRED
EMBODIMENT OF PORTABLE POSTAGE PROCESSOR

---

3k BYTES NON-VOLATILE STATIC RAM

| | |
|---|---|
| CREATION DATE/TIME | CURRENT BALANCE |
| CREATING AGENT ID | STRIKE COUNTER |
| BUTTON TYPE: (POSTAGE) | BALANCE BEFORE LAST REFILL |
| PASSWORD | LAST REFILL DATE |
| USER REGISTRATION ID | LAST REFILL AMOUNT |
| USER NAME | LAST REFILL AGENT ID |
| USER ADDRESS | LAST REFILL POSTAL LOCATION ID |
| USER STATE | LAST REFILL STATION NUMBER |
| USER ZIP | TRANSACTION LOG |
| USER PHONE | EVENT LOG |
| USER FAX | ENCRYPTION KEYS |

BLOCK DIAGRAM OF MEMORY LAYOUT FOR PREFERRED EMBODIMENT OF
PORTABLE SECURITY DEVICE PROCESSOR FOR AGENT AND MASTER

3k BYTES NON-VOLATILE STATIC RAM

| | |
|---|---|
| CREATION DATE/TIME | TRANSACTION LOG |
| CREATING MASTER ID | EVENT LOG |
| BUTTON TYPE: (AGNT OR MSTR) | ENCRYPTION KEYS |
| PASSWORD | |
| AGENT REGISTRATION ID | |
| AGENT NAME | |
| AGENT LOCATION ADDRESS | |
| AGENT STATE | |
| AGENT ZIP | |
| AGENT PHONE | |

*FIG. 13*    1301

SECURE METER PROCESS LOOP

— 1 —

SYSTEM AND METHOD FOR CONTROLLING THE DISPENSING OF AN AUTHENTICATING INDICIA

REFERENCE TO RELATED APPLICATIONS

The present application is a continuation application of pending application Ser. No. 08/516,010, entitled "SYSTEM AND METHOD FOR CONTROLLING THE DISPENSING OF AN AUTHENTICATING INDICIA," filed Aug. 16, 1995, which is a continuation-in-part application of application Ser. No. 08/263,751, entitled "SYSTEM AND METHOD FOR STORING, RETRIEVING AND AUTOMATICALLY PRINTING POSTAGE ON MAIL," filed Jun. 22, 1994, now issued as U.S. Pat. No. 5,606,507, which in turn is a continuation-in-part application of application Ser. No. 08/176,716, entitled "SYSTEM AND METHOD FOR AUTOMATICALLY PRINTING POSTAGE ON MAIL," filed Jan. 3, 1994, now issued as U.S. Pat. No. 5,510,992.

TECHNICAL FIELD OF THE INVENTION

This invention relates in general to a portable postage storage device that can be coupled to processor-based host systems to receive and retrieve an amount of authorized postage and to enable the printing of an authenticating indicia. More particularly, the invention relates to a system and method under the control of a computer for automatically establishing an indicia that can be used to authenticate a postage or similar transaction.

BACKGROUND OF THE INVENTION

Presently, it is common for individuals or businesses to have residing within their offices a postage meter rented from a commercial business such as, for example, Pitney Bowes. This arrangement is very convenient, since letters may be addressed, postage applied, and mailed directly from the office without requiring an employee to physically visit the U.S. Post Office and wait in line in order to apply postage to what is often a quite significant volume of outgoing mail, or to manually apply stamps to each piece of mail.

Quite naturally, postage meters were developed to relieve the manual application of stamps on mail and to automate the above process. Nevertheless, a postage meter residing within an office is not as convenient and efficient as it may first seem to be. First, a postage meter may not be purchased, but must be rented. The rental fees alone are typically over twenty dollars per month. For a small business, this can be quite an expense to incur year after year. Second, a postage meter must be adjusted, serviced and replenished manually; e.g., each day the date must be adjusted manually, periodically the stamp pad must be re-inked, and when the amount of postage programmed within the postage meter has expired, the postage in the meter must be replenished. To be replenished, a postage meter must be manually unplugged, placed into a special case (the meter is of a significant weight), and an employee must visit a U.S. Post Office to have the meter reprogrammed with additional postage. Upon arrival at the U.S. Post Office, a teller must cut the seal, replenish the meter with a desired amount of postage, and reseal the meter before returning it to the employee. The meter must then be returned to the office and powered up.

A slightly more expensive meter (rental of approximately $30.00 more) works in the following manner: 1) a user sets up an account with the meter owner, such as Pitney Bowes, 2) 7 to 10 days before a user requires more postage, the user deposits with the meter owner the amount of postage required, 3) the user then calls the owner (7 to 10 days later) and they issue instructions as to the manual pushing of a variety of buttons on the meter (programming) which will replenish the postage amount on the meter. Nonetheless, the meter must be taken to the Post Office every 6 months.

Thus, in addition to the monthly rent, the servicing and replenishing of the meter requires the time and expense of at least one employee to take the meter to the U.S. Post Office to have it replenished. Of course, this procedure results in down-time wherein the postage meter is not available to the business for the application of postage to outgoing mail. In addition, because of the monthly rent and the size of these devices, it is generally not practical for businesses to have more than one postage meter to alleviate this down-time. Lastly, there is nothing inherent in the postal meter system which inhibits fraud.

As previously mentioned, the alternative to a business, especially a small business, is to forego the advantages of a postage meter and to buy sheets, or books, of stamps. Without a doubt, this is not a sufficient solution. Since a variety of denominations of stamps are generally required, applying two 29¢ stamps to a letter requiring only 40¢, will begin to add up over time. Additionally, it is difficult for a business to keep track of stamp inventories and stamps are subject to pilferage and degeneration from faulty handling. Moreover, increases in the postal rate (which seem to occur every three years) and the requirement for variable amounts of postage for international mail, makes the purchase of stamps even more inefficient and uneconomical.

Because of different postage zones, different classes of mail, different postage required by international mail and the inefficiency of maintaining stamps within an office, it is important to have an automatic postage system, such as the aforementioned inefficient and relatively expensive postage meter.

Accordingly, there is a need in the art for a system and method that provides the automatic placement of postage on mail at locations other than a U.S. Post Office, while not requiring the use of a traditional postage meter.

One major problem with any system in which a portable processor is used for controlling available values in a computer system, such as the amount of postage available to a user, is the maintenance of strict controls on the "filling" of the memory. Any such controls must have as a component the ability to create an audit trail and the ability to withstand unauthorized usage.

Another problem facing any CPU based system with a portable processor to store postage is that the system should optimally interface with a user friendly operating environment that is flexible and can be coupled to other programs such as a word processing or graphics program.

It is a primary object of this invention to provide a system and method to dispense postage in a secure manner so that it can be authenticated on a piece-by-piece basis.

It is a further object of this invention to provide a system and method which allows for the external authentication of printed indicia from information obtained from the material upon which the indicia has been attached.

Another object of the invention is to use a printed indicia based upon information contained in a portable processor which will provide management information via the indicia to the authenticating agency, such as a post office.

Another object of the invention is to provide a system and method whereby various configurations of postage indicia can be input into the portable memory device.

It is a further object of the invention to provide a system and method whereby the user can select from several configurations of postage indicia which the user desires to print on an item of mail.

It is a still further object of the invention to provide a system and method whereby a user can import personalized, or customized, postage indicia graphics into the interface program which allows a CPU to read a portable processor device.

It is a still further object of the invention to be secured from outside attempts at reverse engineering, not only for the protection of the portable processor as a trade secret but so that the integrity of credits it dispenses is never in doubt.

SUMMARY OF THE INVENTION

These and other objects and advantages are present wherein a portable device is constructed with a memory and having a processor controlling that memory. The device is arranged to communicate with a PC in order to exchange instructions therewith.

The portable processor device has on board certain security related fields, such as the date and time, the balance, random number generators, number of transactions that have taken place on the device, and the serial number of the device. It also has on board when the user initializes the device, information about the owner of the device including his/her name, the registration number and other information about the owner such as the user's address and password.

When the device is used and a transaction is about to be debited from the device, the information about the transaction, such as the debit amount and other transaction information that is postage related, such as the addressee's ZIP code, the addressor's ZIP code, the recipient's address and name, the mail class, etc. These are all uploaded to the device from the PC. The processor stores them in memory, then it takes all of these packets of information, the security information, the owner information and the transaction information and encrypts them into a packet, using its own key which is on board the device (it is not given externally). Once the debit has taken place, the device gives data back to the PC in encrypted form. The PC then takes that information and packages it into an indicia in the form of a portable data file so that that encrypted information can then be authenticated by the authenticating agency after it has been delivered along with a document. If the object is not to print the indicia but to authenticate a transaction that is being transmitted electronically, then the packet is used for verification of the electronic data. Typically, the verification occurs at a point remote from any connection to the PC or to the PC user.

In yet another preferred embodiment of the present invention, the display screen coupled to the processorbased system employs a "Windows" type display for interfacing with the user. Through the display screen, the program will request a password from the user and the amount of postage the user wishes to apply to a piece of outgoing mail or corresponding label for subsequent application to a package or envelope. The user will enter the desired amount of postage; the program will retrieve this postage stored within the portable processor, and the E-STAMP program will print postage indicia through a coupled printing device onto the outgoing mail or label.

In still yet another preferred embodiment of the present invention, the program may be coupled to a word processing program residing within the processor-based system. As a result, the application of the postage indicia may be made in conjunction with the word processing program, which has the capability to print envelopes, separately or in conjunction with the printing of a corresponding letter produced by the word processing program.

Furthermore, the system may also be programmed to print the address, return address and postage indicia on correspondence. This correspondence can then be placed in envelopes with cutouts or glassine paper at the appropriate areas so that the address, return address and/or meter stamp can be visualized through the envelope.

In another preferred embodiment of the present invention, the aforementioned portable processors are specially manufactured by Dallas Semiconductor for use in conjunction with programs, i.e., unique serial numbers specific to the program are embedded within each portable processor button. These serial numbers are then recorded in a user registration database for use by the Post Office and the POSTSCAN Software to scan and verify letters. Thus, a form of security is provided since only the portable processors specially manufactured for use with the E-STAMP program are able to receive or retrieve data pertaining to postage amounts, as previously described.

Additionally, a special user-defined password shall be dedicated for use with the program so that access is only provided to users entering the correct password. The aforementioned serial numbers and passwords may, in addition to protecting against unauthorized use, also allow a user and the Postal authority to track postage used by every company, department, employee, etc. Furthermore, other software programs may also be configured to access the control program so that spreadsheets and/or graphs may be produced providing statistics on postage use within a business.

Furthermore, the control program can be used to encode a variety of information within the postage indicia using bar code symbol technology. Such information would be machine readable and can be used to identify postal indicia forgeries, in combination with the established control database of active system users.

In an alternative embodiment of the present invention, the system is arranged to automatically calculate the correct postage to place on a letter, parcel or label as a function of the class, zone and weight of the particular item to be mailed. One embodiment of the present invention includes a balance coupled to the host processor-based system so that mail can be placed on the balance and the weight of the mail automatically entered into the system for calculating the correct postage for that mail.

When the portable processor memory is refilled, the recorded transaction information can be analyzed either from the perspective of management information or to try to detect fraud. This allows for authentication or verification at a point remote (both physically and electronically) from the user and remote from the PC and even remote from the portable processor.

It is one technical advantage of this invention that the most vital security-related pieces of the system are performed on board the portable processor so that it is not very easily tampered with.

It is another technical advantage of this invention that the portable postage devices are easily transported from one standard computer to another.

It is another technical advantage of this invention that the portable postage storage devices are durable, long lasting and economical. One method of accomplishing this is to use a portable processor with a hardened case, not allowing direct contact with the processor. In this way, the code which defines the personalizing of the processor remains secret and cannot be disassembled.

It is another feature of this invention to provide a system and method that as transactions take place the portable memory records information about each transaction and maintains a log of the most recent transactions.

In one embodiment, it is a technical advantage of the invention that it presents an entire system and method for dispensing postage electronically using a portable processor and refilling of the portable processor through the use of a secure credit server with the transformation of a combination of credits and information about the portable processor user into a graphical security interface, such as a printed postage indicia, entitling the user to obtain an official transaction at a point detached from both the processor and the user (such as the sending of a parcel in the mail system).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 3A illustrates one embodiment of a user registration form;

FIG. 3B illustrates a postal or verification indicia;

FIG. 3C illustrates an encoded user registration form;

FIGS. 8 and 8A illustrate a display interface provided to a user when accessing the present invention on a host processor-based system;

FIG. 9 illustrates an envelope used to display the postage indicia printed on a letter;

FIGS. 10A–10F illustrate how the master, agent and postage buttons are validated;

FIG. 12 illustrates how a postage button is encoded;

FIG. 13 illustrates how an agent or master button is encoded; and

DETAILED DESCRIPTION OF THE INVENTION

The present invention provides for a portable postage dispensing device, described in more detail below, that can be coupled to a host processor-based system at both the customer's site and at the postal authority or an authorized agent. Throughout the remainder of this description, reference is made to the U.S. Post Office, postal authority or its agents. Note, however, that the present invention may be implemented within any country and with respect to any postal system or with respect to any data packet which is being examined by a validating authority detached, both physically and electronically, from its source.

The present invention will allow an individual to purchase a desired amount of postage at an authorized agent of the U.S. Post Office, such postage being stored within a portable postage dispensing device, which itself is a portable processor. The user may then invoke a host processor-based system to access and retrieve a portion of the stored amount of postage via a program stored on the host processor-based system, such program hereinafter referred to as the "E-STAMP®" program. The E-STAMP program requests input from the user on the weight of the item to be mailed, the addressee's address, etc. The E-STAMP program utilizes the information that was entered to calculate the amount of desired postage for an item to be mailed and prints a meter stamp, indicia, on an envelope, label or letter through a printer or special purpose label maker coupled to the host processor-based system.

The portable postage dispensing device can also be coupled to a host processor-based system located at the authorized U.S. Post Office Agent. Particular post office sites and authorized agents will have installed a system complimentary to the software system installed on the customer's PC. The program installed at the U.S. Post Office, hereinafter referred to as the "POSTMAKER™" will allow an authorized agent to interface the portable postage dispensing device with the host processor-based system residing at the authorized refilling agent in order to replenish the amount of postage programmed within the portable postage dispensing device in an amount requested and purchased by the customer.

Figure 1A:
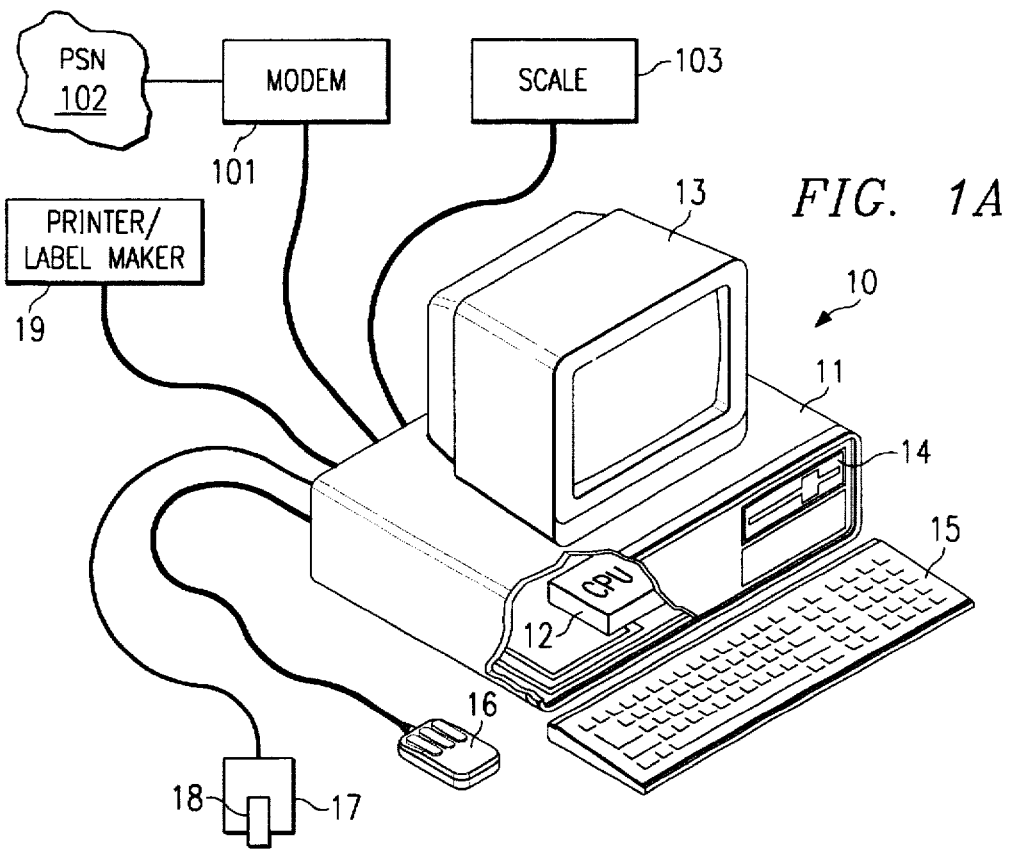
FIG. 1A illustrates a host processor-based system for implementation of the present invention.

Referring to FIG. 1A, there is illustrated a processor-based system (10) utilized for implementing the present invention, specifically the aforementioned E-STAMP and POSTMAKER programs. System 10 includes chassis 11 enclosing processor ("CPU") 12 and disk drive 14. Coupled to CPU 12 is display 13, keyboard 15 and mouse 16. Furthermore, system 10 is adapted for coupling with a postage storage device 18, such as the preferred embodiment portable processor button 182 illustrated in FIG. 1B and shown in block diagram form in FIG. 11. Postage storage device 18 is coupled to processor-based system 10 through a postage storage device receptor 17.

The portable postage dispensing device may be any securable, intelligent device having some residual data capability, where that device can provide sufficient security measures to efficiently limit access to the memory and executable code of the device to authorized users. Intelligence is defined as having a CPU or other processor and memory built into the portable processor device.

The preferred embodiment, portable processor button 182, incorporates a small disk having a memory and CPU. Portable processor button 182 is a small, light-weight, portable, essentially non-breakable device available from Dallas Semiconductor, Dallas, Tex. A portable processor button may be coupled to host processor-based system 10 through button holder 172. In a preferred embodiment of the present invention, a batch of buttons will be manufactured with specifically designated serial numbers for use solely with the present invention. However, disposable portable processor buttons 182, preloaded in various denominations, could also be sold either over the counter or in existing stamp machines at post office locations. The postal authority may also select to sell pre-loaded portable processors, on which the customer pays a deposit, that can be exchanged for another portable processor or returned for the deposit whenever button 182 is depleted of postage. All authorized postal agent locations may sell pre-loaded portable processors or the postal authority may elect to designate particular postal authority locations for selling portable processors.

An advantage of the preferred embodiment (the portable processor button 182) is that a portable processor button 182 is small enough and light enough that several may be carried in one hand. Furthermore, the portable processor button 182 is sufficiently durable to be sent through the mail. The fact that the portable processor is universally usable with PC's allows the per unit cost to be lower.

Figure 1B:
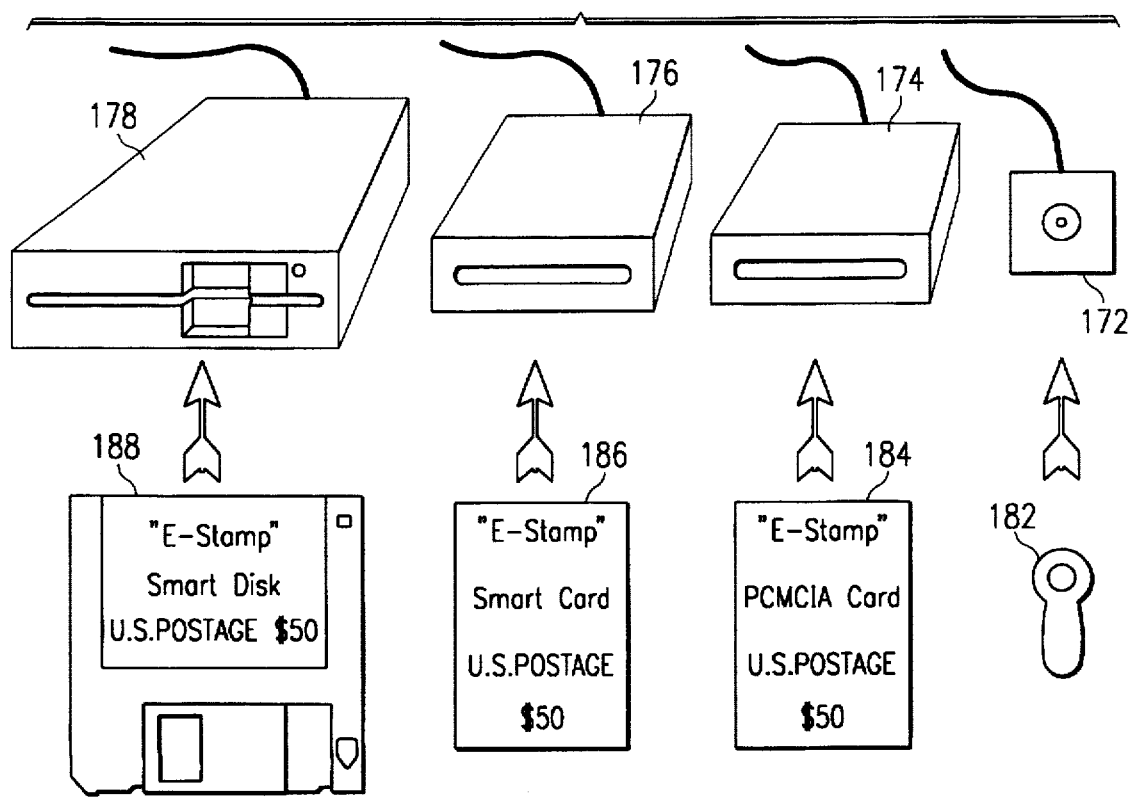
FIG. 1B illustrates several embodiments of the postage storage device.

Additional alternative embodiments of the portable postage dispensing device 18 are illustrated in FIG. 1B. One alternative postage storage device 18 is a smart disk 188 incorporating its own electronic modules capable of read/write operations. One embodiment of such a smart disk 188, Smart Disk™, can be obtained from Smart Disk Security Corporation, Naples, Fla. The Smart Disk™ looks like a floppy disk and fits into a typical PC's floppy disk drive, connected either externally or internally to host processor-based system 10; however, Smart Disk™ has its own microprocessor that provides secure, password protected storage. One advantage of the Smart Disk™ is that it can operate in a standard PC disk drive without modification to the disk drive or PC. Smart Disk™ provides security for stored postage with an encrypted password and the encryption algorithm.

Another type of portable postage dispensing device 18 is a smart card 186, a plastic card with an embedded microchip. The microchip contains mathematical formulas that encrypt computer data to secure access to that data (i.e., postage) and verify a user's identity before allowing access to the data. One drawback in the currently available smart cards 186 is that they require a smart card processor 176 hooked to the processor-based system 10.

Still another type of postage storage device 18 is a PCMCIA card 184. PCMCIA cards are currently used on notebook computers for modular storage and communication. Both external and internal add-on readers 174 (i.e., card slots) are available for PCs.

The postal storage device 18 may be used on a variety of host processor-based systems 10. Host processor-based systems 10 may be located in an individual's home, at any business location, or may even be present in a post office lobby for after hour usage. In a preferred embodiment, system 10 is a PC. In an alternative embodiment, system 10 could be part of a main-frame computer or system 10 could be part of a network system of multiple host processor-based systems.

Typically, a user will buy a portable postage dispensing device 18, containing a small quantity of postage, included with a copy of the E-STAMP program. The user will then install the E-STAMP program on the user's host processor-based system 10.

Figure 2:
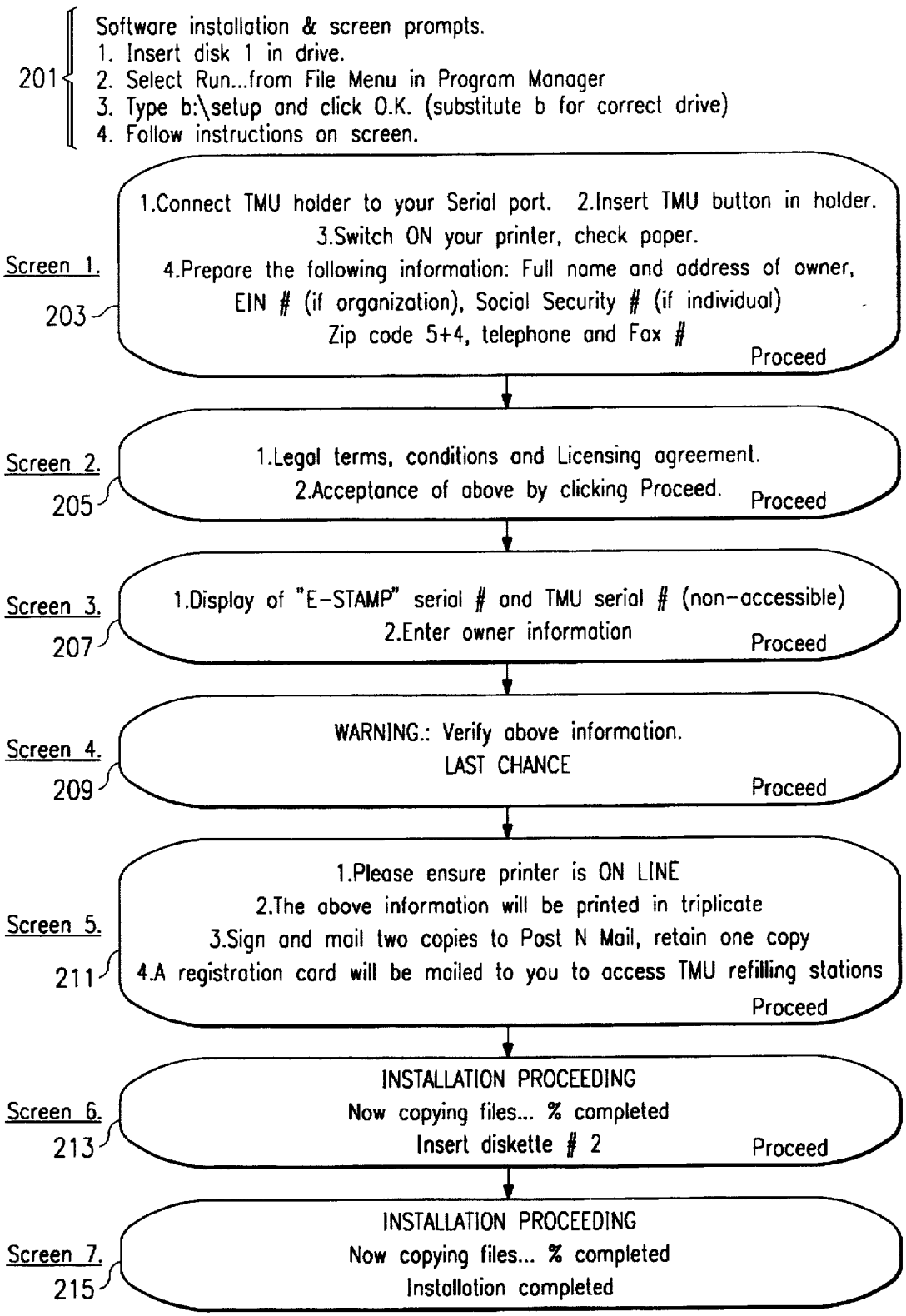
FIG. 2 illustrates an embodiment of user instructions and screen prompts utilized by the present invention to interface with a user when installing the program on the processor-based system for implementation of the present invention.

FIG. 2 illustrates one embodiment of user instructions and screen prompts to be followed by the user during the installation of the E-STAMP program. The instructions and screen prompts illustrated in FIG. 2 reflect the installation of the E-STAMP program in a Microsoft "Windows" operating environment on a PC equipped with a portable processor 182 and portable processor holder 172. Of course, other means could be employed for implementing the present invention within a host processor-based system 10.

The user installation instructions 201 inform the user how to pull up the E-STAMP installation program. Once the installation program is initiated, screen 203 will appear. Screen 203 instructs the user to connect the TMU holder 172 to a serial port and to insert the TMU button 182 into the holder 172. The user is then instructed to turn on a printer 19 that has been coupled to the processor-based system 10 and check to see that the printer 19 is supplied with paper. Screen 203 further requests that the user prepare the following information: the user's full name and address, an identification number for the user (i.e., an employer identification number (EIN#), if the user is a business or organization; or a social security number (SS#), if the user is an individual), the user's ZIP code, the user's telephone number and the user's fax number. The next screen, screen 205 displays the Post N Mail License Agreement with its legal terms and conditions. Acceptance of the terms and conditions set out in the license agreement is indicated when the user continues with the installation program.

Next, screen 207 will appear and display the E-STAMP serial number and TMU serial number. At this time the user-specific information requested in screen 203 should be entered into the E-STAMP program. Once the user has entered the user-specific information, screen 209 will appear warning the user to carefully verify the correctness of the entered information.

After verifying the information added into the E-STAMP program, screen 211 will remind the user to ensure that a coupled printer 19 is on line. The user information entered into the E-STAMP program will then be incorporated into a user registration form, one embodiment of which is illustrated in FIG. 3. The E-STAMP registration form will be printed in triplicate. The user is instructed to sign and mail two copies of the registration form to the creator of the E-STAMP program, Post N Mail, Inc. and to retain one copy of the registration form. Screen 211 also informs the user that a registration card will be mailed to the user in order that the user may access TMU refilling stations.

The E-STAMP installation program continues with screen 213, which describes the progress being made in installing the E-STAMP program, and screen 215, which informs the user when the E-STAMP program installation has been completed.

Referring to FIG. 3A, there is illustrated a preferred embodiment of the E-STAMP registration form. The registration form includes information such as the portable processor button serial number 31, the E-STAMP serial number 32, the date and time that the E-STAMP program was installed 33, and user-specific information 35 (e.g., name, address, telephone and fax numbers, and identification number), and a copy of the Post N Mail License Agreement 38 having an identified location for the user to sign. A preferred embodiment of the E-STAMP registration form will also contain all of the information needed to specifically identify the TMU button, E-STAMP program, and registered user in an encrypted format 301 FIG. 3C. The encrypted information 301 will be in a machine-readable graphical security interface, such as a standard bar code. In the preferred embodiment, the code would be the PDF417 code discussed in more detail below.

As will be discussed, indicia 300 shown in FIG. 3B also has a logo portion 39 and a printed "human readable" portion 38 as well as an encrypted portion 37. It is this portion 37 which is read and, if desired, compared to a database at a location remote from the user, remote from the generating PC and remote from the portable processor.

The standard bar code contains white and dark areas in the form of bars that can be read by a laser scanner. The laser scanner illuminates the white and dark areas with a light of a certain frequency. The light is reflected back to the laser scanner in such a way as to indicate the pattern of white and black areas within the bar code. Since white areas reflect much more light than dark areas do, a perpendicular scan of the bar code will allow the scanner to translate the reflected light into the coded information. More than 20 linear bar code languages have been developed, each with its own specifications for how many bars and spaces make up a character, how characters are to be arranged, whether the characters can be letters as well as numbers, and so forth. The most widely-used bar code is the Universal Product Code (UPC) seen on everyday grocery items. The standard bar code currently used by the post office is POSTNET ZIP+4 described in Postal Service Publication number 67.

More sophisticated graphical security interfaces have been developed over the last decade, such as Intermec Corporations' Code 49 and Laserlight System Inc.'s Code 16K. A major advantage of these more sophisticated graphical security interfaces is that they contain an error-correction formula which can often recover the entire message even if parts of the code have been torn or damaged.

A preferred embodiment of encrypted information 301 is a graphical security interface developed by Symbol Technologies of Bohemia, N.Y. and is called PDF417, a portable data file. PDF417 is a graphical security interface constructed from data units called "words," each of which is 17 modules long. Bars are made from filling in up to six consecutive modules and each unit has four separate bars and four spaces. In essence, PDF417 can stack the equivalent of up to 90 one-dimensional bar codes, each just three hundredths of an inch high. Thus, the PDF417 symbology is more complicated to produce and scan than is the typical one-dimensional bar code and allows for a denser coding of information. Because the PDF417 symbology specification includes sophisticated protocols for error-correction, the actual density of information is highly variable, but can be ten times the amount of information found in U.S.P.S. PostNet bar code, per square inch. PDF417 is available from Symbol Technologies, Inc., 116 Wilbur Place, Bohemia, N.Y. 11716 and the operation of the PDF417 is detailed in PDF Primer obtained from them and is hereby incorporated herein by reference.

When Post N Mail, Inc., the system administrator, receives the signed License Agreement from the user, the encrypted information 301 can be scanned with a laser scanner so that the information contained therein can be automatically transferred to a Registered User's database. The purpose of this database will be more fully discussed below. When the encrypted information 301 has been transferred to the registered user's database, a registration card containing a serial number will be printed and mailed to the registered user. The valid entry of the user registration information in the Post N Mail Database guarantees that user's mail to pass verification at the U.S. Post Office, for the letter scanning equipment will be connected to Post N Mail for real-time verification of mail.

System 10 may be utilized at a customer site for permitting a user to retrieve postage stored within portable postage dispensing device 18, via the E-STAMP program, for subsequent printing as a postage indicia onto a piece of mail through printer 19, coupled to system 10. The utilization of the E-STAMP program by a customer will be further described below.

POSTMAKER FUNCTIONALITY DESCRIPTION

Figure 4A:
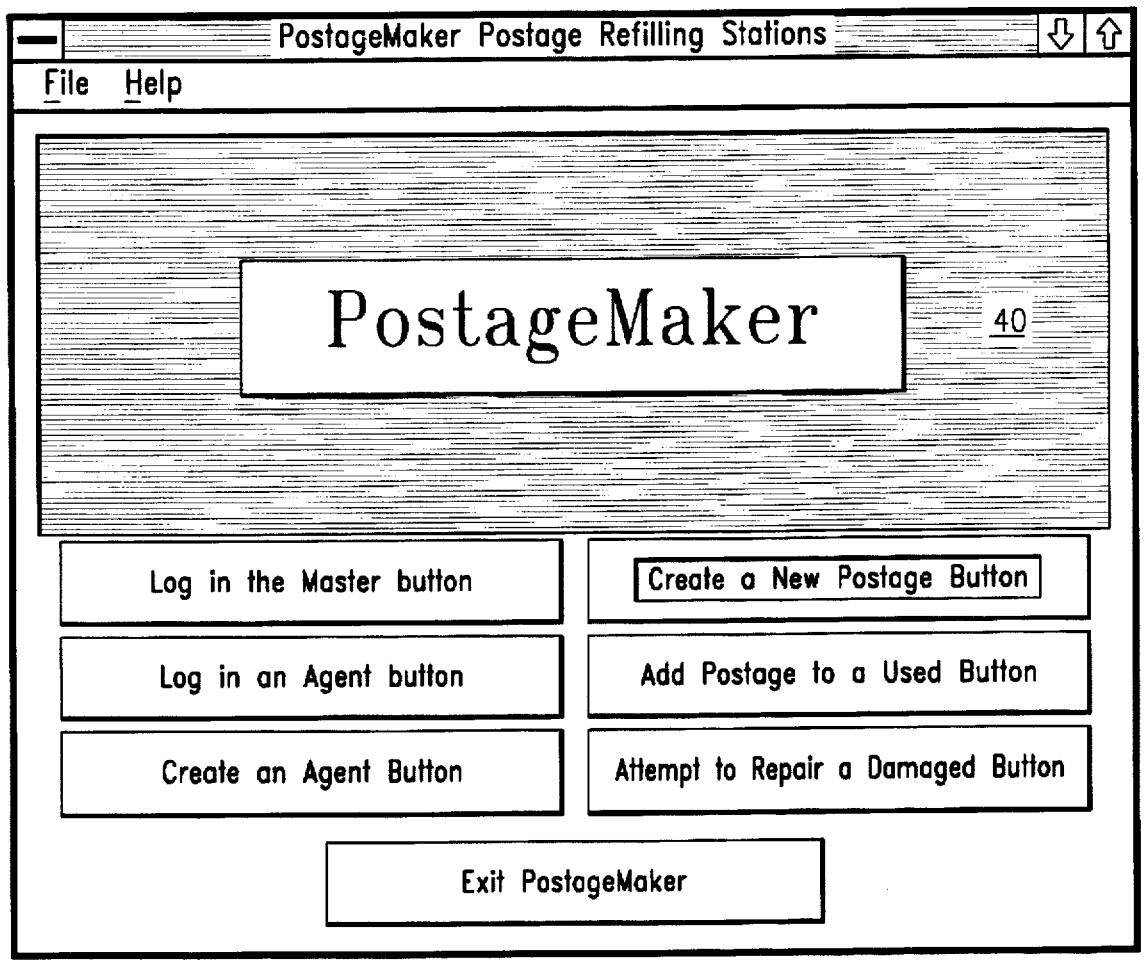
FIGS. 4A–4O illustrate display screens utilized by the present invention to interface with a postal authority employee when replenishing postage within the present invention.

Referring to FIG. 4A, there is illustrated a preferred embodiment of a display screen 40 shown on display 13 (FIG. 1A) to a postal agent when accessing the present invention on system 10. Of course, the particular display aspects illustrated in FIG. 4A may be modified in any one of numerous ways. Also, in a preferred embodiment of the present invention, host processor-based system 10 will provide for input from a user via keyboard 15 and mouse 16. However, other various forms of input may be utilized, such as a light pen or touch-sensitive screen (both not shown).

Figure 4B:
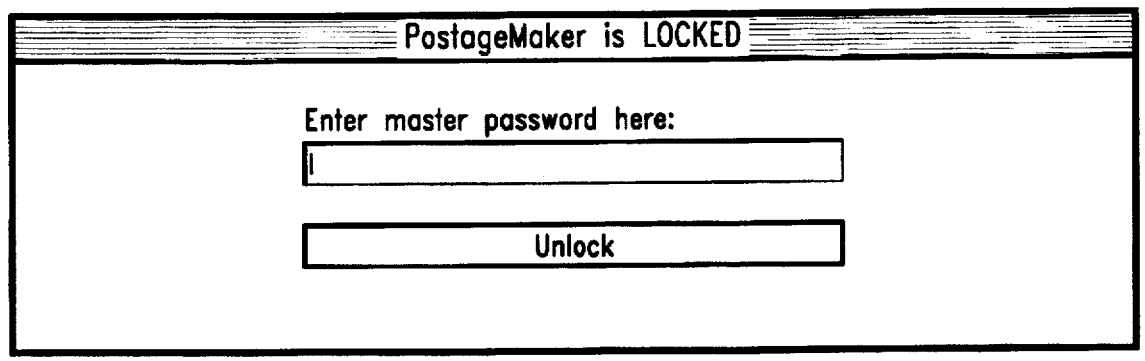

The main screen consists of function "buttons" which may be clicked on with the mouse 16 to activate them. At the beginning of a session, the postal agent must have a supervisor enable the program by putting a master portable processor button 18 into holder 17 and clicking on the function "Log in the Master Button." The master password is typed into the dialog window illustrated in FIG. 4B. The password here will be passed to the master security button for verification against the one stored inside of it. If the password is incorrect or the button was not the correct one for this supervisor an error will be displayed and the POSTMAKER users will be prompted to retry the master login operation.

Figure 4C:
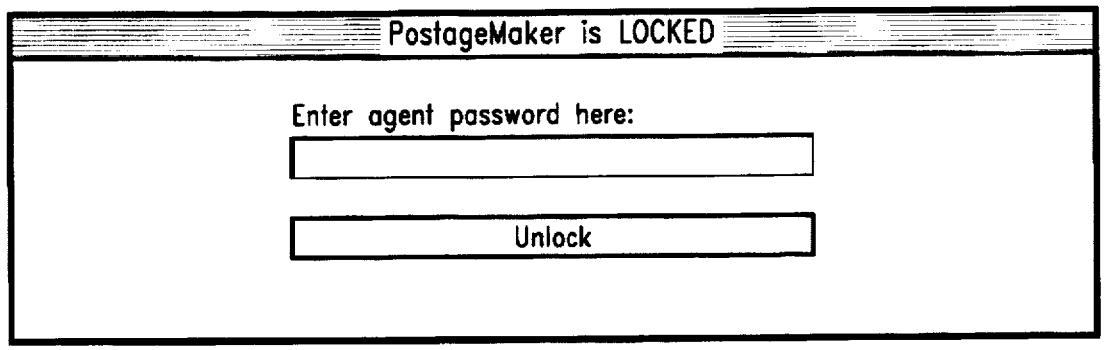

With login successfully accomplished, the postal agent then must log in to the POSTMAKER system by plugging his/her agent portable processor button 19 into holder 17 and clicking on the function "Log in the Agent Button." The agent password is typed into the dialog window illustrated in FIG. 4C. The password here will be passed to the agent security button for verification against the one stored inside of it. If the password is incorrect or the button was not the correct one for this agent an error will be displayed and the POSTMAKER users will be prompted to retry the agent login operation.

Once both master and agent security buttons have been logged-in, POSTMAKER is now considered to be a valid credit server. In this discussion, credit server is defined as a host system-based application which is empowered to allow portable postage dispensing devices, such as device 18, to become credited with prepaid postage values for subsequent control of a processor based system.

Figure 4D:
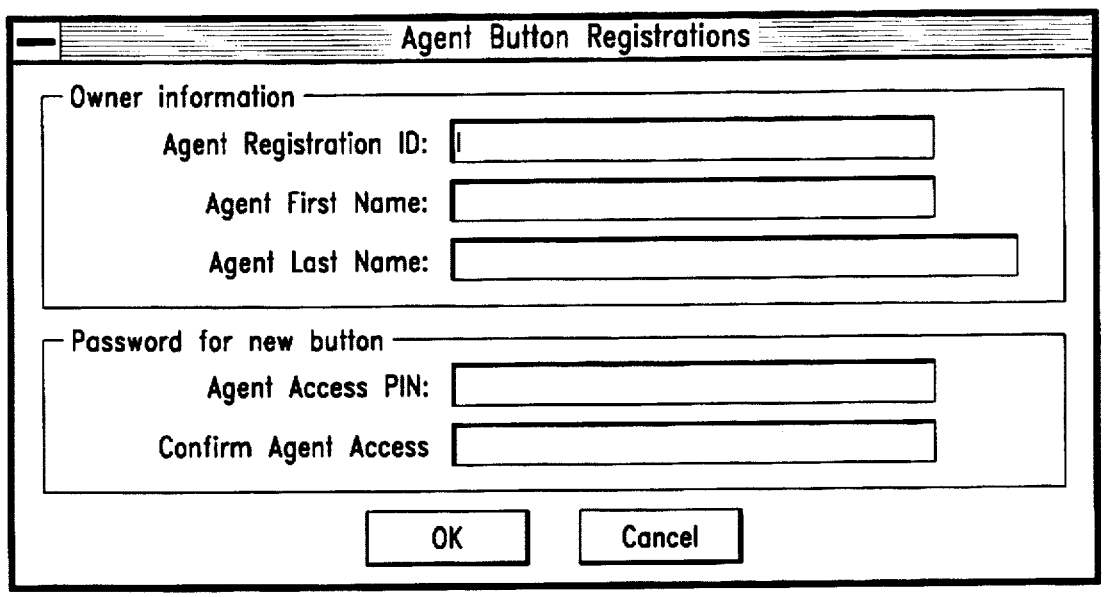
Figure 4E:
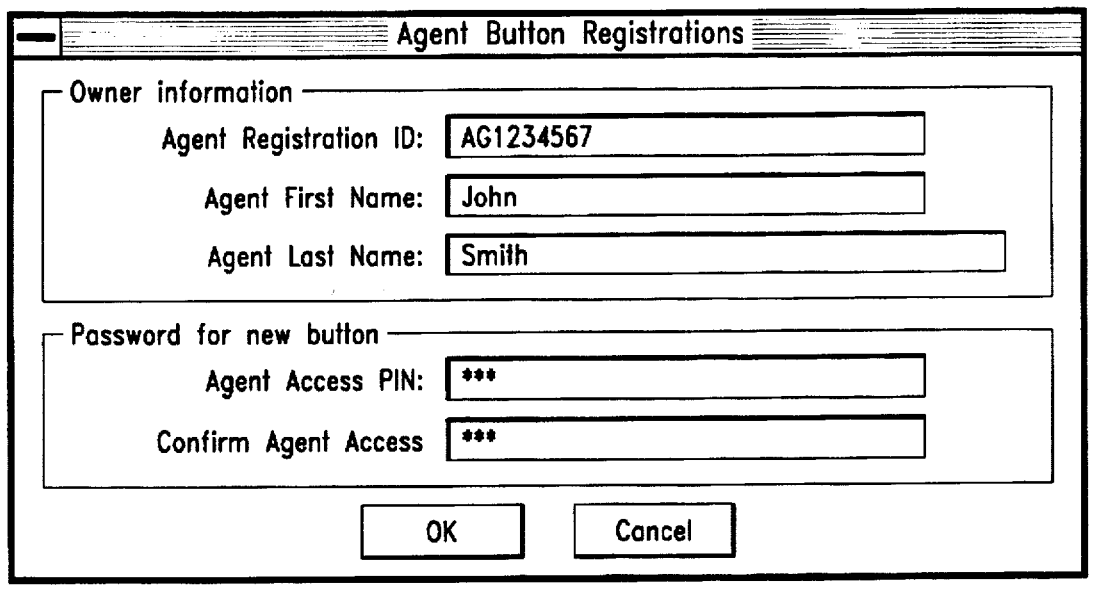

If it should be necessary to create an agent security button, the function "Create an agent Button" should be selected with mouse 16. A valid logged-in agent button is not necessary for authorization to perform this operation. Only a valid logged in master button is required. Once the "Create an Agent Button" function is selected and it has verified proper authority as has been previously asserted, the dialog window in FIG. 4D appears. The Agent Id, Name and access password must be input so they can be registered on the newly formatted agent button. An example of this information appears in FIG. 4E.

Figure 4F:

Once this dialog has been fully filled out, the "OK" button should be selected to continue the operation. If "CANCEL" is selected the dialog window appears and the function terminates leaving main control to the main screen pictured in FIG. 4A. If "OK" was selected, the dialog window in FIG. 4F appears, prompting the agent to place a blank button on the interface 17 and hit the ENTER key on keyboard 15 when ready (or use mouse 16 to select the "OK" button on the dialog).

Figure 4G:

The host processor-based system 10, executing the POST-MAKER program will complete the operations necessary to format the button as an agent security device and if successful will display the dialog window pictured in FIG. 4G. Select OK to continue.

To format a new portable postage dispensing device, the agent must select the "Create a New Postage Button" function by clicking on it with mouse 16. At this point, the dialog window in FIG. 4H appears prompting the agent to put a blank postage button on the holder 17. Should the operation fail, a dialog warning of this will appear. If successful, a receipt such as shown in FIG. 4I will print out on the designated agency printer. The receipt is necessary because of the initial value bestowed on the postal button by the credit server POSTMAKER. Along with the receipt, a record is kept in the host processor-based system 10 of the transaction for logging purposes.

To add postage to a portable postage dispensing device, the agent must select the function, "Add Postage to a Used Button" with mouse 16. Once this is done, the portable postage dispensing device, which was previously placed on the holder 17, will be read and the dialog window in FIG. 4J will appear if the button was newly formatted and has not yet been registered with POST N MAIL. If the button has been previously registered and is being refilled, a dialog window like that in FIG. 4J will appear but with supplementary information as pictured in FIG. 4K. In both cases, the button serial number is the same, but user registration data has been completed in the latter version in FIG. 4k. User registration information displayed here are: PNM Registration No., Name of registered button owner and ZIP code of registered button owner.

In FIG. 4J, the button has a current balance of $2.00 and expires on Aug. 23, 1995. By filling in an amount in the Transaction Balance field, the agent can refill this button, even though it lacks registration information. It should be noted however, that the E-STAMP program will not allow transactions to be made with this button before it has been registered with POST N MAIL and a valid registration number has been stored on the portable processor button.

In FIG. 4K, the already-used and registered button has a current balance of $102.09 and its expiration date is Aug. 23, 1995. Expiration date is always set by POSTMAKER as 90 days from the date of refill. This implies that revisits for refill operations must take place at least once every quarter. This is an arbitrary restriction and can be changed if desired.

Continuing with the refill operation, if the agent is requested to put $100 worth of postal value on the portable postage dispensing device by the user, this amount is entered in the "Transaction Balance" field with keyboard 15 as shown in FIG. 4L. Selecting the "Accept" function at the bottom of the dialog window will give another dialog window for validation purposes, such as that in FIG. 4M. Clicking "OK" makes this dialog window disappear and control returns to dialog window 4L with the "Refill Balance" field filled out with the $100+ previous balance of $2 giving total $102. Clicking "Cancel" in Dialog window 4L simply returns to dialog window 4L without updating the refill balance field. Selecting "ReEnter" at the bottom of dialog window 4L allows the "Transaction Balance" field to be redone in the case a mistake was made. The "Cancel" function at the bottom of dialog window 4L simply cancels the function and returns control to the main window pictured in FIG. 4A.

The actual committing of the credit operation happens when "OK" is selected at the bottom of dialog window 4L. The meter is credited and dialog window 4N appears to tell the agent the operation was successful. At this point, if successful, a receipt such as shown in FIG. 4O will print out on the designated agency printer. The receipt is necessary because of the new postal value bestowed on the portable postal dispensing device by the credit server POSTMAKER. Along with the receipt, a record is kept in the host processor-based system 10 of the transaction for logging purposes.

Normally, the portable processor is completely secure from tampering but certain conditions might trigger the portable processor to disable itself to protect its internal postal value integrity. Should this ever happen, the function "Attempt to Repair a Damaged Button" can by used by agent to notify the portable processor that the matter has been investigated and no fraudulent actions appear to have been committed. This allows the button to start to work again accepting commands from a host processor-based system 10 for both crediting and debiting operations.

E-STAMP FUNCTIONALITY DESCRIPTION

Once the required amount of postage has been transferred to the portable processor button 182, the user may then physically carry the button back to the user's business location and couple the portable processor button 182 to a host processor-based system 10 through button holder 172. Upon invocation of the E-STAMP program by the customer, the customer's host processor-based system 10 can access the postal amount stored in portable processor button 182 and download portions of the stored postage to the E-STAMP program to be used for printing postage indicia on pieces of mail.

Figure 7:
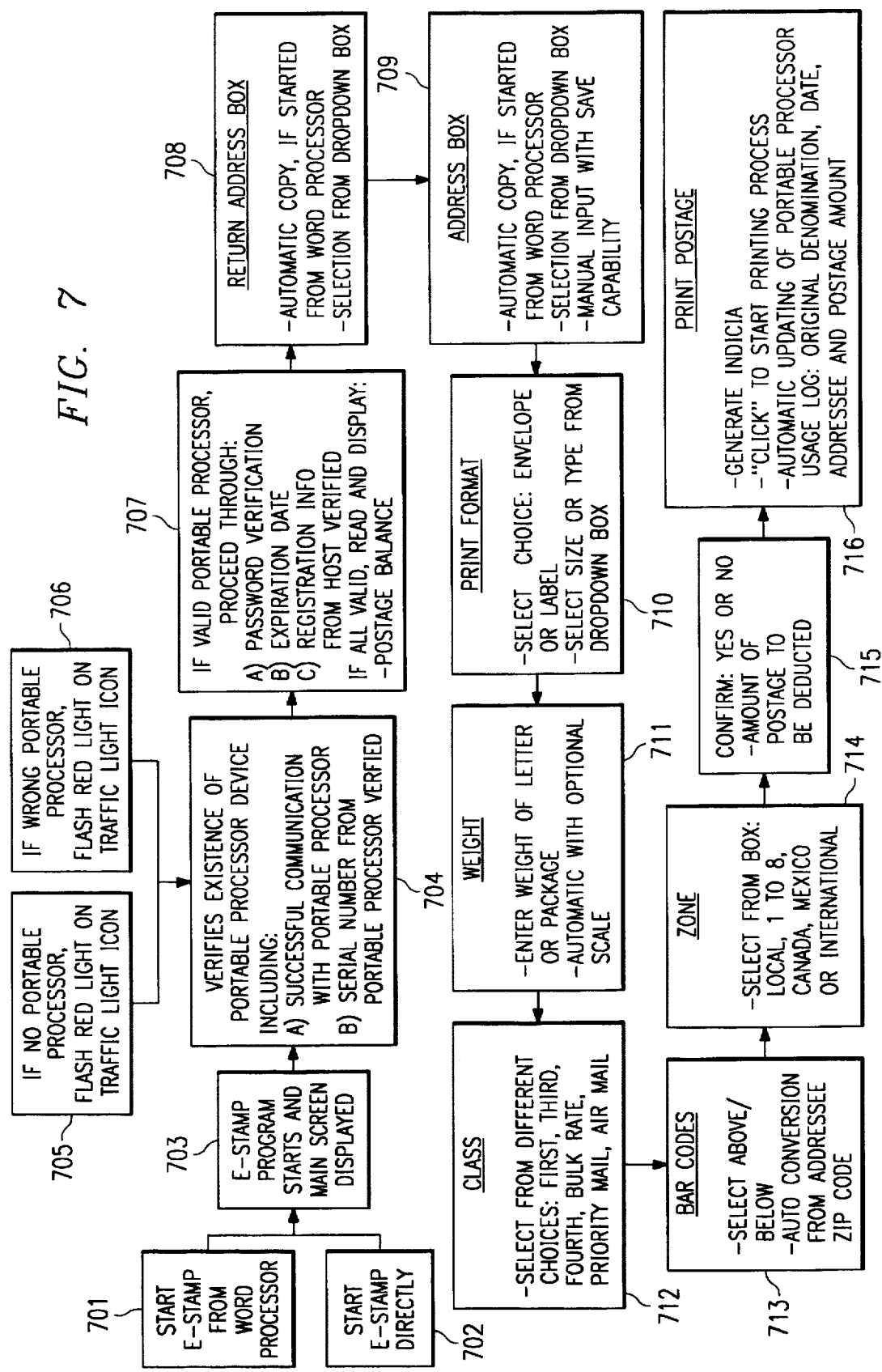
FIG. 7 illustrates a flow diagram of the operation of the present invention within a host processor-based system.
Figure 8:
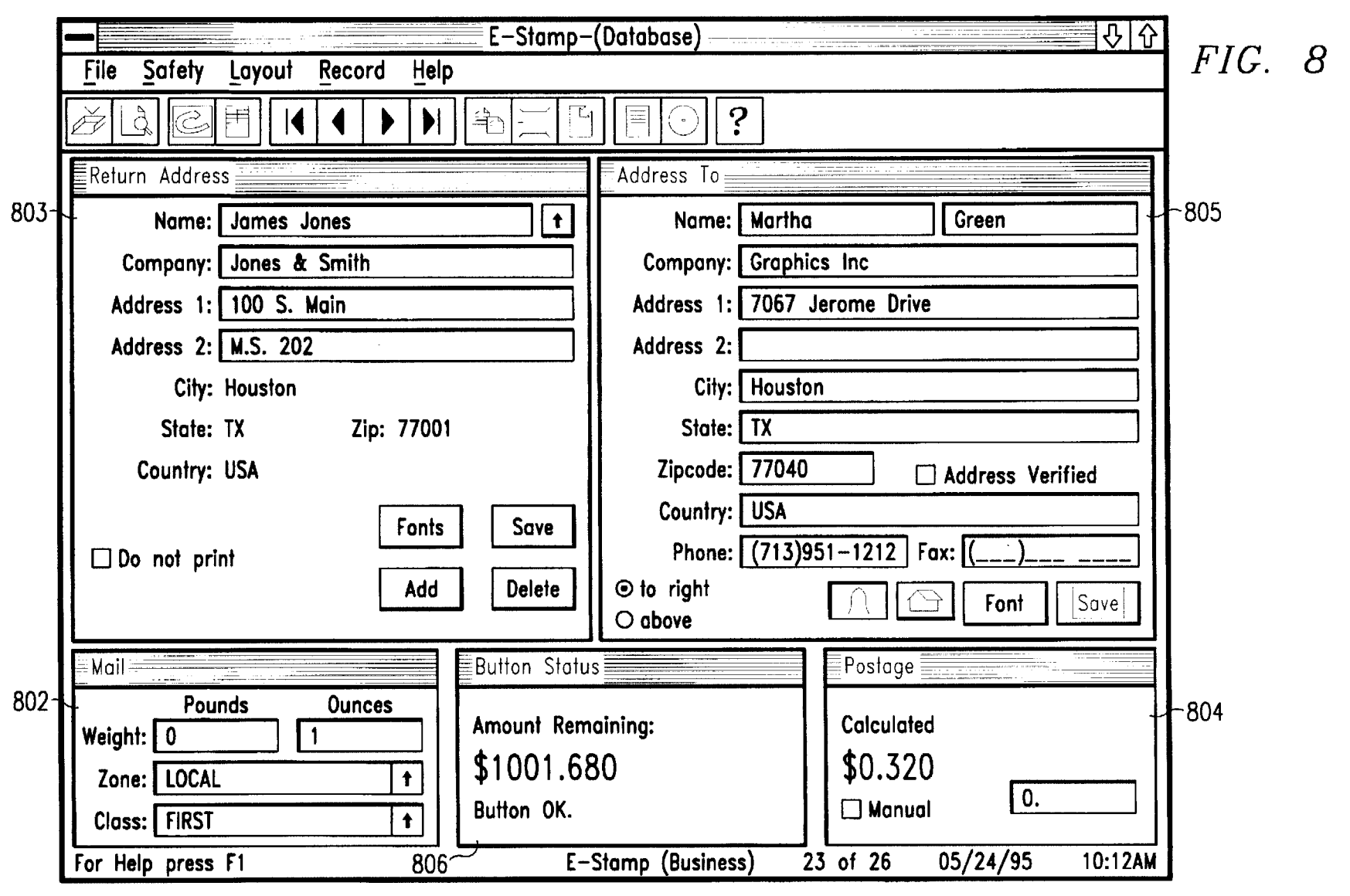

Referring next to FIG. 7, there is illustrated a flow diagram of the process employed within host processor-based system 10 configured for allowing a user to print a postage indicia. As previously discussed, the E-STAMP program may be a stand-alone program, or it may be associated and coupled with a word processor program. Therefore, the E-STAMP program may be started directly (step 702) or via step 701. Thereafter, at step 703, the E-STAMP program shows display 80, illustrated and described with respect to FIG. 8, to the user.

Next, in step 704, as shown in FIG. 7, the E-STAMP program verifies the existence of portable processor button 182 coupled to host processor-based system 10. If portable processor button 182 has not been inserted within its holder 172, at step 705, a message is flashed to the user to insert portable processor 182. If the wrong portable processor button, or a portable processor button not programmed for use with the E-STAMP program, has been inserted and coupled to system 10, a warning is flashed to the user to insert an authorized, or valid, portable processor button 182 as illustrated in box 706. The process of portable processor verification represented by box 704 includes several steps as follows:

Step 1—Successful communication with portable processor within its strict communication protocol and command structure already demonstrates likelihood that at least the type of button is correct (i.e., it is more than just a Dallas Semiconductor button, it is a button running the proprietary code particular to the postage application outlined herein).

Step 2—Serial number of portable processor is verified against encrypted registration information in the PC.

If a valid portable processor button is coupled to system 10, at step 707, other information stored in the secure environment of the portable processor is demanded via the common command structure used for host-to-button communications. The process of portable processor connection represented by box 707 includes several steps as follows:

Step 1—E-STAMP passes user password entered to portable processor and verification takes place within the secure environment of the portable processor button to guarantee maximum secrecy of the password. Password is never stored in host processor-based system 10.

Step 2—If the portable processor reports a result from Step 1 as a password match, E-STAMP will then be able to access the command facilities of the portable processor to ultimately print postage indicia thereby deducting value from the internal data representation of credit within the portable processor.

Step 3—Portable processor verifies its own expiration date based on an internal realtime clock. Host processor-based system 10 never has opportunity to interfere in this decision.

Step 4—If the result of the expiration date check of Step 3 is that the portable processor is still valid, the user registration information stored in the host processor-based system 10 is passed to the portable processor for validation.

Step 5—If the check of Step 4 is valid, the current meter balance is displayed in the center-button part of the E-STAMP program screen block 806, just to the left of the traffic light icon which will also display "green" to indicate that a valid portable processor button is available for use in printing postage indicia. If any of the above checks are invalid, the traffic light displays "red" to indicate that a valid postage dispensing device was not detected.

Next, at step 708, return address box 803 is completed automatically or manually. The address within 803 may be automatically entered from the adjoining word processor program, the address may be selected from a drop-down box (not shown), or the address may be manually input. Any entered address may be saved within the E-STAMP program. Additionally, if a return address is not desired, it may be omitted.

Thereafter, in step 709, the contents of address box 805 are entered in a manner similar to the contents of return address 803.

Any one of a number of "time-out" scenarios could be employed. For example, a preestablished time of three months from last refilling, or the time-out could occur a certain time after non-use.

Next, at step 710, the user may select the print format by the use of the "Print Setup" standard dialog box selected in the "File" Menu as pictured in FIG. 8A. As illustrated, the postage indicia may be printed on a label through printer/label maker 19, or a choice may be made to print the postage indicia on an envelope inserted within printer 19, which may be chosen to be a standard size or a nonstandard size as selected by the user. Note that if the postage indicia is to be printed on a label, it may be desired that the return address within 803 and the address within box 805 not be printed.

Alternatively, the postage indicia and the addresses within boxes 803 and 805 may all be printed on a flyer, a pamphlet, a postcard or a sheet of paper. Whenever the indicia is printed on a letter, along with the addresses in boxes 803 and 805, that letter may be folded so that the indicia will show through an opening or window 901, in the top right hand corner of a specially designed envelope 900 illustrated in FIG. 9 and as shown in co-pending Design patent applications Ser. No. 29/022,913, filed May 16, 1994, and Ser. No. 29/039,328, filed May 24, 1995, both incorporated by reference herein.

Envelope 900 may be a standard or non-standard size with any number of windows as designed by the user. Typically, envelope 900 will have a first window 901 in the top right hand corner for the printed postage indicia to show through. Envelope 900 may also have other windows for the addressee's name and address (903) and for a return address (902) to show through. Envelope 900 may have glassine paper, or other transparent covering material 904, covering the described windows such that the postage indicia and other imprinted information is protected from inadvertent detachment and adverse conditions (such as inclement weather).

Thereafter, in step 711, the user enters the weight of the package or letter associated with the postage indicia. This weight may be entered manually, or automatically through the use of scale 103 coupled to host processor-based system 10 in a manner well known in the art. In step 712, the user selects the class of mail from the choices shown in box 809.

Thereafter, in step 713, the user may select the location of routing information for the recipient address. Such information will be automatically extracted from the address, and formatted in the PostNet symbology for ZIP+4 information, as provided in Postal Service Publication 67 and incorporated herein by reference.

Typically the postal indicia may include any combination of the following information: the date, the postage dispensing device serial number, the sender's ZIP code, the addressee's ZIP code, the expiration date of the postage dispensing device, the cumulative values of the strike and dollar counters, PNM registration number and the post office identification number. The postage indicia shall contain this information which was encrypted by the portable postage dispensing device and presented to the outside world thusly, thereby guarding the data content of the indicia a secret to all but the U.S. Post Office scanning equipment which will be charged with decoding the indicia bar code and decrypting the information for use in verification of the integrity of the indicia. The postage indicia physical form may encode the encrypted information within an insignia or design, or it may appear as a background for the postage amount printed in a visually recognized form.

Furthermore, the use of the POSTMAKER program in conjunction with a database program will allow the authorized postage by post office location (or ZIP code), post office agent, portable postage dispenser serial number, etc. This information can be easily compiled to determine post office sales, market forecasts, etc.

The E-STAMP program will automatically incorporate the aforementioned entered parameters—weight, class, zone—in order to correctly calculate the correct postage to print in conjunction with the postage indicia and to deduct from the postage amount stored within portable processor button 182.

Lastly in step 715, the user confirms his/her choice to print the postal indicia or not, thereby with the understanding that that amount of postage will be deducted from the balance in the portable postage dispenser 182. If YES is chosen, control passes to step 716 and the E-STAMP program utilizes the input/output ports of host processor-based system 10 to send to printer/label maker 19, the correct data pertaining to the indicia to be printed on an envelope, letter, card or label.

The amount of postage printed on the indicia is automatically deducted from the amount stored within portable processor button 182 by the button itself on command from the host processor-based system 10 in step 716. Other internal information is automatically updated, including the usage record for this particular portable processor, which is kept internally, but accessible to the outside host via authorized commands. Such usage records include, but are not limited to, addressee, postage amount, date, and the original denomination.

Note that during the selection of the various parameters within display 80, the E-STAMP program may be implemented to update the postage amount displayed within meter display 806 as the ongoing communications dialog between the portable processor and host processor-based system 10 is essentially a real-time basis.

Box 802 is provided for the user to insert the location (ZONE) from which the mail is to be sent. The location may be used to calculate the correct postage for the indicia. The date that the mail is stamped is automatically adjusted every day by a real-time clock which exists in the safe confines of the portable processor and therefore cannot be tampered with by external influence. This will help prevent pre-dating or post-dating of mail. The date and if desired, time, shall also be encrypted in the postal indicia for external verification.

The "Print Preview" option selected from the file menu in FIG. 8A is provided to not only get an idea of how the finished envelope (or label) will look but to add personalized items such as a greeting or graphical bitmap which might represent a company logo for instance.

The aforementioned steps may be repeated for a subsequent piece of mail, or the user may decouple the portable process button 182 from the system 10.

Using the E-STAMP system and method, users like lawyers, accountants, advertising agencies, etc., who bill their clients for postage will be able to keep track of postage expenses on a per-client basis.

POSTAGE REFILLING CONTROL

In the preferred embodiment, portable processor button 18 includes secure non-volatile (battery-backed) memory and a CPU (central processing unit) capable of executing instructions. These items are enclosed in the confines of a hermetically sealed metal can. While the internal operating code which gives the portable processor its useful attributes is kept in ROM (read-only memory), the extremely sensitive data representations of monetary value, strike counters, usage logs, refilling logs and encryption keys used to encrypt the information passed to the host processor-based system 10 which executes E-STAMP and is then conveyed to a postage indicia for use in mailing a parcel.

As discussed in further detail below, there are three different types or applications for the portable processor button 18 which relate to different levels of authority and use: Master buttons (Authority Level 2) which are provided to a limited number of supervising postal authority personnel; Agent buttons (Authority Level 1) which are provided to authorized postal agents who perform refill operations on used portable postage dispensing buttons and initialization operations on new portable postage dispensing buttons; and postage buttons (Authority Level 3) which allow the postal customer (user) to print an authorized amount of postage indicia using a separate host processor-based system controlled by the user. In actuality, the first two types of buttons are known as security devices which grant authority to serve credit and maintenance to the third type of button which is a postage dispensing device usable by postal clients.

In the postal authority (or authorized refill center), both a valid master and a valid agent button must be coupled to the Postal Authority/Refill Station (POSTMAKER) version of system 10 before a refill or initialization operation of a postage button can take place.

The master, agent and postage buttons are all validated by the Postal Authority/Refill Station software during refill operations. Each postage button (Level 3) is validated by the customer's E-STAMP software prior to the commencement of any indicia printing operations. The sequences for validating the master, agent and postage buttons using the Postal Authority/Refill Station software are depicted in FIGS. 10A–10F.

The Postal Authority validation procedure for a button coupled to system 10 begins at Step 1000 (FIG. 10A), with the initiation of the POSTMAKER refill station software. For discussion purposes, assume only one portable processor button 18 has been coupled to system 10 at this point. At Step 1001, the software reads the communication bus to see if any valid devices exist on it. If no, it just continues to look in a "loop." If yes, the POSTMAKER software running in system 10 sends a command to the portable processor button 18, as in Step 1002, to demand status information for the button. The button, which is reset from a "sleep" or dormant state when it receives the command, can verify its contents to be correct and that it is the type of button (POSTAGE or SECURITY DEVICE) that the host system 10 expects to work with. If a valid response does not come back before a time-out in Step 1003, it is assumed that the button on the communication bus is not valid and an error message would be displayed. If the response is OK, it is implied that there is a good chance this is a PNM-programmed button because of its validated response to the PNM-specific command issued to it.

At this point, depending on the type of button expected, the status information is checked to see if the button is of that type in Steps 1005, 1006 and 1007. Based on the decision of what type it is, a connect operation for that type of button is attempted in Step 1008, 1014 or 1019. If master or agent security device, a security device type of connect is issued to the button and a correct response must be received by the host system 10 before proceeding. In Steps 1010 or 1016 a master or agent password is demanded of the user depending on which type of button is being serviced. Step 1011 validates this password by passing the password to the button so that it can verify it in its own secure environment. The password is never stored in host system 10 for security reasons. A positive validation of password from the button grants the host authority level of 1 for master and agent simultaneously on the bus and authority level 2 for master only on the bus.

Assuming that the button was a POSTAGE type and the connection which was made in Step 1019 is made and verified in Step 1020, the POSTMAKER software does not require the validated password of the POSTAGE button to continue. However, it will check that the proper authority level two has been previously granted by the presence of both a validated agent and master button on the bus at the same time in Step 1021. If the proper authority level has not been attained, no operations may be performed on the POSTAGE button. If that authority exists, control can proceed to Step 1018 in the case of a customer demand for new button initialization, old button credit refill or old, damaged button repair operations.

Figure 10A:
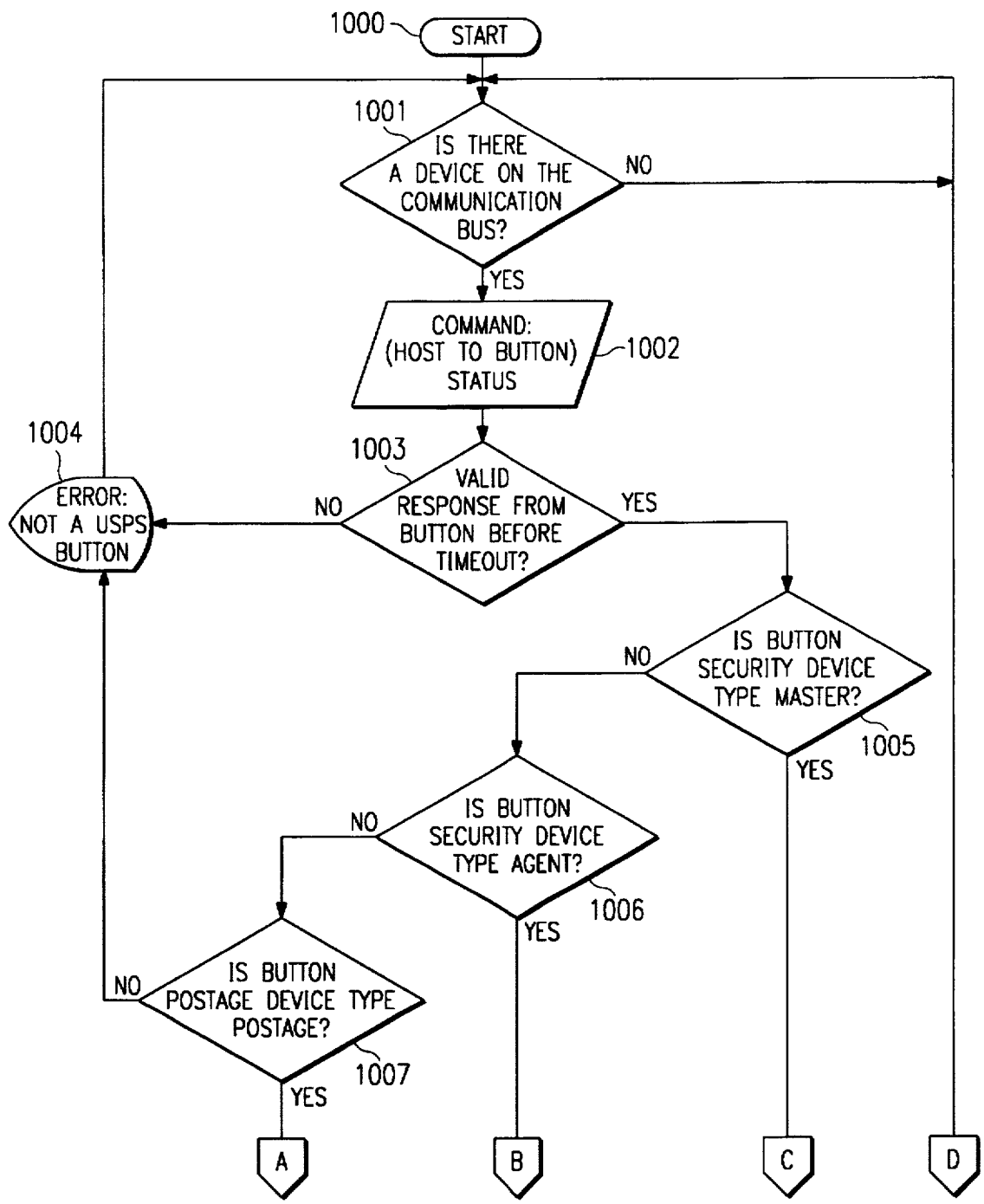
Figure 10B:
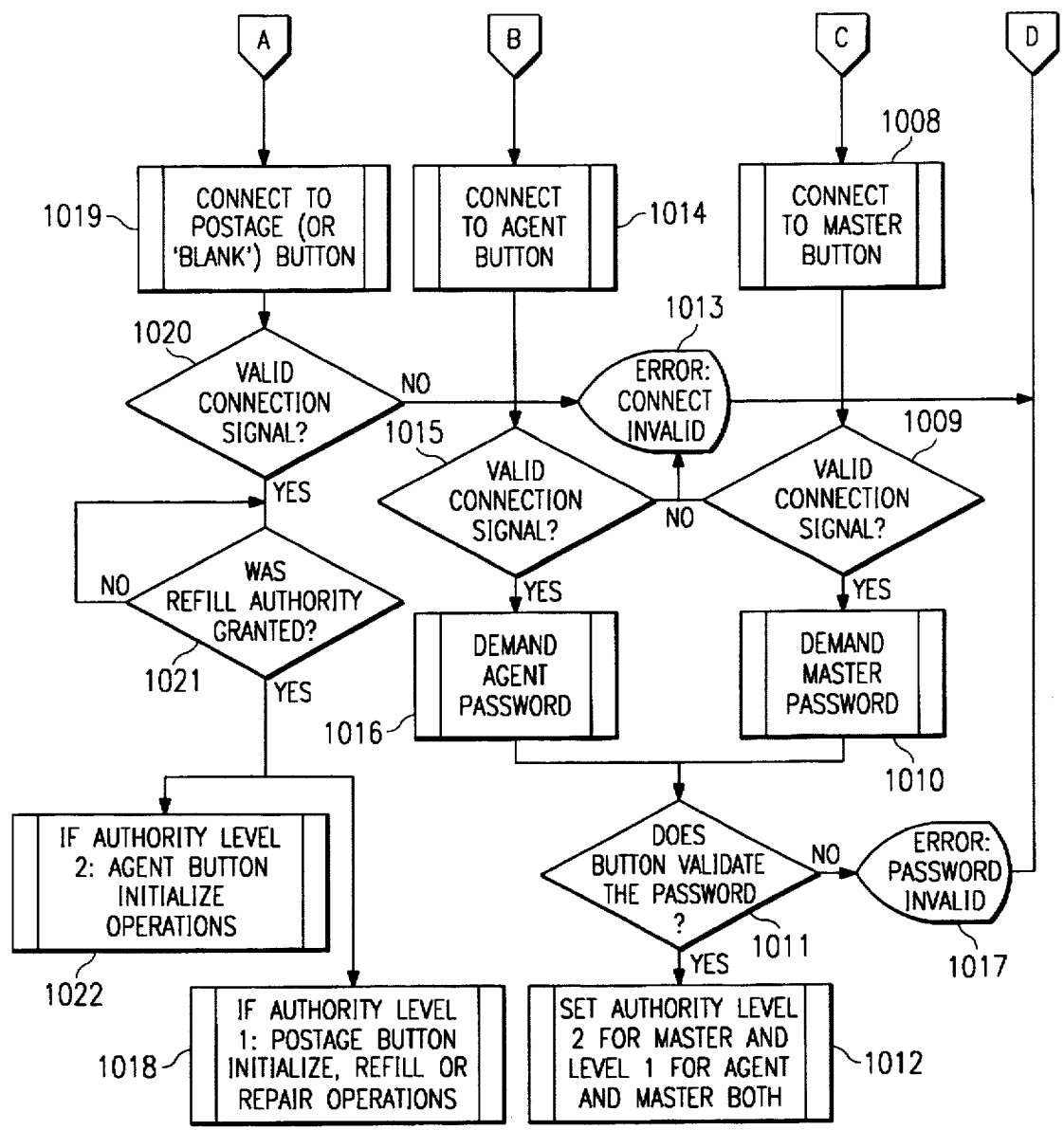

The credit refill operation to a used button is depicted in FIG. 10B, step 1030. The credit command must first verify, in step 1031, its authority level is correct and set at one by the presence of valid and password unlocked master and agent buttons. Provided this is the case, in step 1032, the amount of postage to be credited to the button is input by the authorized agent into a form dialog window and validated for correctness by the POSTMAKER software. In Step 1033, the CREDIT command, amount and a conglomeration of encrypted data known as a security packet are sent to the POSTAGE button which must decode and validate and if all appears to be valid, perform the credit operation before the time-out signified in step 1034 which will occur if the response does not come back from the button to the host system 10 in a specified period of time. It is the security packet that allows the button to continue with the credit operation. This data structure has a predefined layout and contents which are encrypted using a certain key and method of encryption. This security packet contains data items, such as identification numbers of master and agent issuing the credit to the button, host date/time (which must match not exactly but closely with internal button date/time), workstation number for host system 10 running the POSTMAKER software and postal authority location identification. Other data items could be used for checking purposes. This security packet is different in form and function from the one described herebelow in FIG. 6.

Figure 5A:
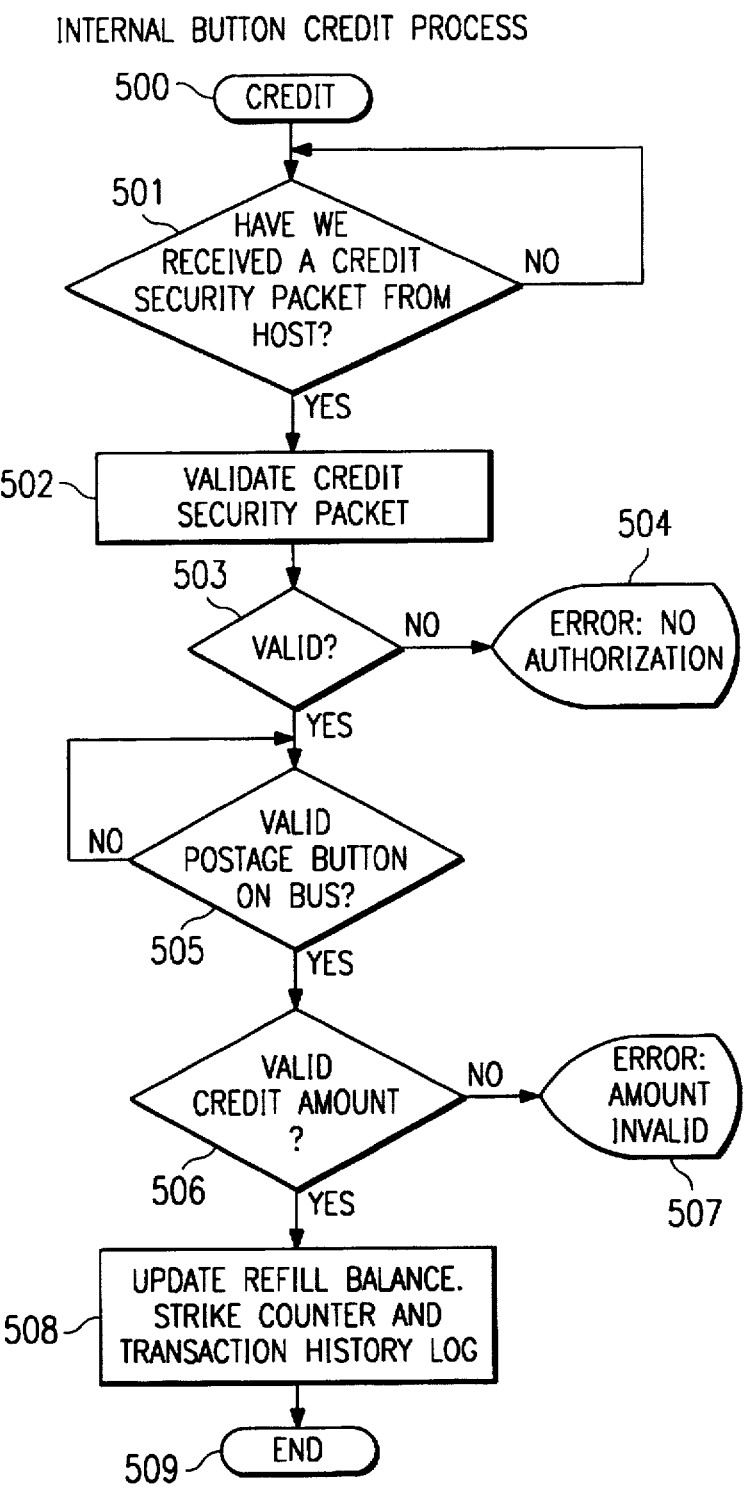
FIGS. 5A and 5B illustrate flow diagrams of the replenishing and debiting processes.

FIG. 5A, which begins with step 500, depicts the credit process. Box 501 reviews the material received from the host to determine validity. Boxes 502–504 validate the security packet. Box 505 validates the proper button is on the bus. Boxes 506–507 validate the valid credit amount and box 508 updates the internal memory. Box 509 ends the routine.

Figure 5B:
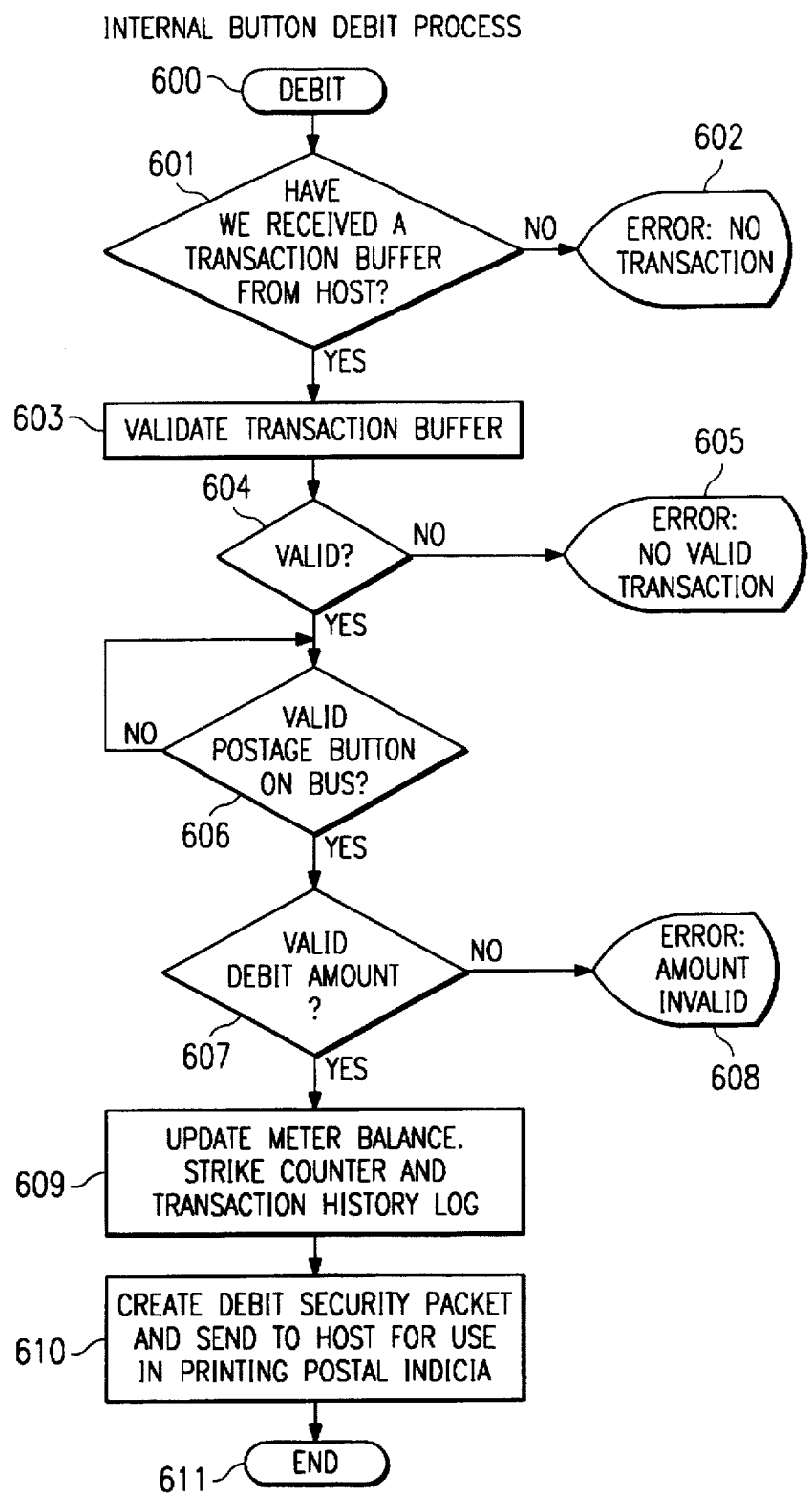

FIG. 5B shows the button Debit Process which begins with box 600. For boxes 601–605 a transaction buffer request from the host is checked. In boxes 607–608 the validity of debit amounts on the bus are checked. Box 609 updates the internal registers of the button and box 610 creates the security packet for transmission to the host. Box 611 ends the routine.

Figure 6:
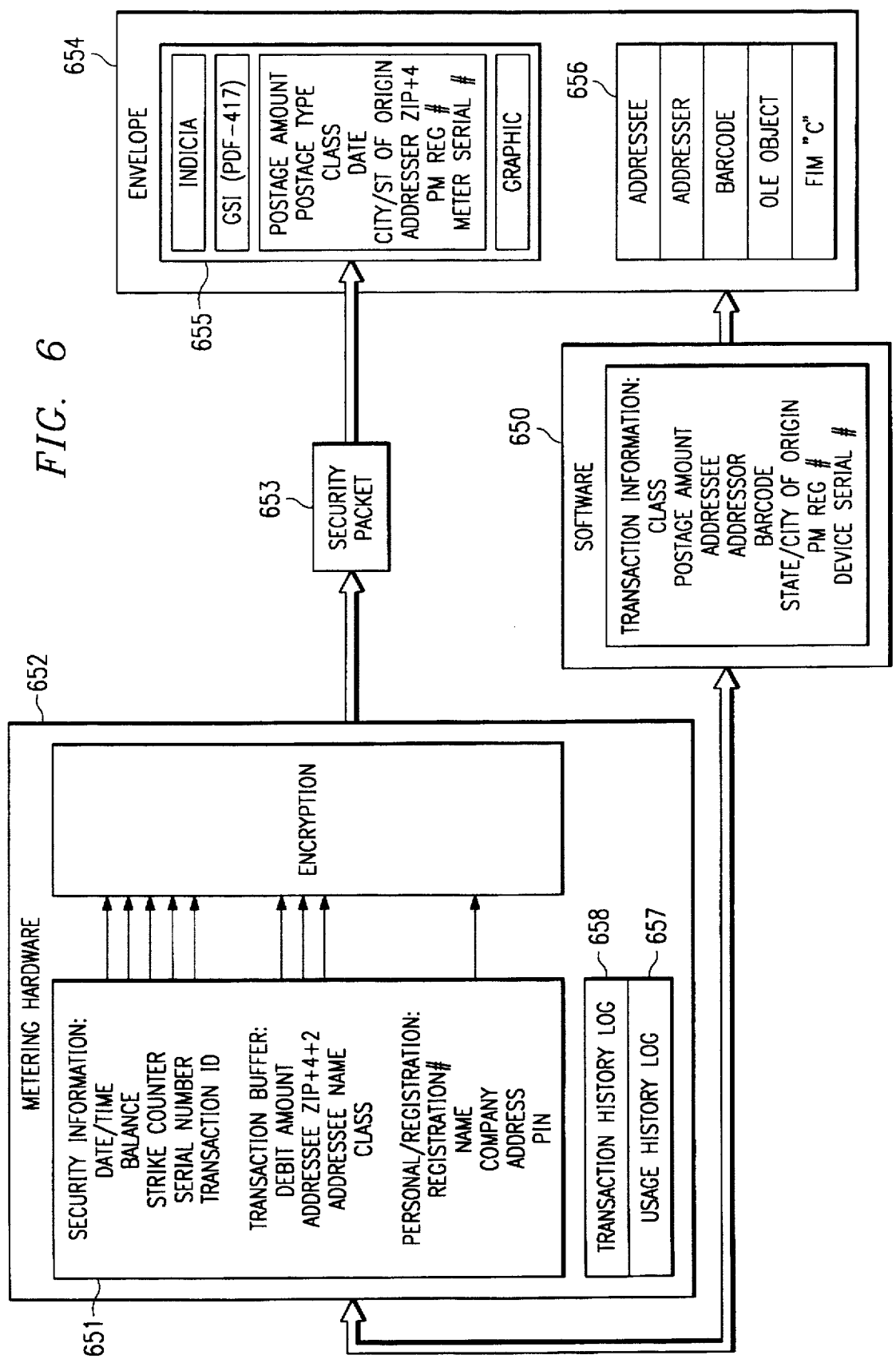
FIG. 6 illustrates a preferred embodiment of the security techniques utilized within the present invention.

Referring to FIG. 6 there is illustrated a preferred embodiment of the transformation of user information by the portable processor button into a data entity known as a security packet which is then handed off to the E-STAMP application, running in a host processor-based system and transformed into an indicia for inclusion on an envelope.

The process begins in Box 650 in the software, running in the host processor-based system, when a user fills out an envelope and demands of the program that it be printed with an indicia of x amount of postage determined by weight, zone, etc., as shown in boxes 654, 655 and 656. Much of the information to be printed on the envelope will be transferred to the internal software printing functions which interact through interfaces with the "Windows" operating system by methods well known in the art.

In addition and before this hand-off of information is accomplished, in Step 651, the program sends a command to the portable processor button 18 (FIG. 1A) to create a data entity or form known as a security packet. Included with the command is the data that will produce the envelope which includes, but is not limited to, date and time, current balance of metering device, strike counter of total transactions, serial number of meter, transaction id, debit amount, addressee ZIP code, addressee name and class of postage. There is also a complement of information about the user: registration id, name, company and address. Included for secure access to the button is the personal identification number (PIN) which is the password used to unlock the button and is validated within the secure environment of the button.

Once the PIN is validated, the secure processor 18 accepts all of this data from the host process-based system and in Step 652, using internal math coprocessor hardware, encryption software algorithms and encryption keys, the portable processor produces the security packet using information from Boxes 657 and 658. The encryption algorithms can advantageously be RSA public/private key but might be changed at any time related to security issues. Indeed, this security packet, produced in the secret and secure environment of the portable processor becomes indecipherable to the outside world including the host processor-based system. The only other entity which should have knowledge of the keys to be able to decrypt this packet would be the postal authority in their designated mail sorting and scanning centers.

In Step 653, the security packet is transmitted back as a response to the host processor-based system. This indecipherable security packet is then handled blindly by the program to the point where it is passed on to a software function within the program which will encode security packet 653 into a bar code image. The program then takes this bar code image, includes certain other unencrypted information for the visual identification of the postage indicia and passes this through the programmer's interface to the "Windows" system to the standard printing facilities of that environment in a fashion well known in the art. Also included in this step is the passing of the return and designation addresses and all other parts of the envelope which must be printed and can vary based on user choices before the printing step.

These "Windows" printer drivers, supplied with the "Windows" system and apart from the E-Stamp system, can change for any given printer installed, isolating an application program such as E-Stamp from the innate differences of these printers in a fashion known as "device independence" also well known in the art. The driver, in Steps 655 and 656, does its work of printing on the envelope, 654, which has already been inserted in the printer.

In Step 1036 (FIG. 10B), a receipt is printed out for the customer and the results are written in a transaction log stored on host system 10 or on another system 10 connected to the system 10 running E-STAMP or POSTMAKER through a local area network.

The POSTAGE button initialization operation for new (never used buttons) is shown in FIG. 10c beginning at STEP 1040. The initialization command must first verify, in step 1041, its authority level is correct and set at two by the presence of valid and password-unlocked master and agent buttons. Provided this is the case, in step 1042, the initialization function must locate a "blank" button on the bus. A blank button is defined as one which has pre-loaded operating instructions in its internal read-only-memory which are specific to the PNM/Postal authority application outlined in this patent. The operating instructions must also be of the type of button being initialized. That is, those instructions for a POSTAGE button are somewhat different than those for a SECURITY DEVICE button necessitated by the differences in their operating behaviors and functions.

When a button, POSTAGE or SECURITY DEVICE type, receives an initialization command from the host system 10, it must first have instructions in it to tell it what initialization means and what should be performed to accomplish this. Thus, it is the button that initializes itself after receiving a command from a host system 10, not the host system 10 directly writing in memory locations within the button. The architecture of the button is such that outside influence can not directly change its operating instructions or memory. The host system for the button can only issue commands as defined in a narrow set of criteria to the button to make it perform a task such as initialization, credit or debit operations and repair of damaged memory.

In Step 1043, the actual initialize command is issued from host system 10 to button and response of completed or not must return before the time-out period as shown in step 1044.

In step 1046, the positive or negative outcome are displayed on host system 10 display screen to the agent. The transaction is logged and a customer receipt is printed out by POSTMAKER before ending the initialization function.

The internal layout of data in RAM for a POSTAGE button is depicted in FIG. 12, as box 1201.

The POSTAGE button repair operation is shown in FIG. 10D beginning at step 1050. The repair command must first verify, in step 1051, its authority level is correct and set at one by the presence of valid and password-unlocked master and agent buttons. Provided this is the case, in step 1052, the repair function must locate a damaged, but still valid POSTAGE button on the bus. A damaged button is defined as one which has some internal memory location(s) which have been lost or changed because of internal program errors in the POSTAGE button itself. Another type of "damage" which may need repair might result if a POSTAGE button had ever been lifted from its holder while a host system 10 was issuing commands to it and the button was in the middle of executing some of those commands and the user lifted the button off of its holder. This would then immediately stop execution of the internal operating code of the button, perhaps leaving the results of the intended operation indeterminate.

A more permanent kind of damage might be the loss of internal RAM or ROM which would probably be catastrophic enough that total replacement of the button would be in order. Such replacement would necessarily dictate marking the button serial number as invalid in the PNM user registration database and entering the new button serial number for that user once it has been replaced and registered.

In Step 1053, the actual Repair command is issued from host system 10 to the POSTAGE button and response of completed or not must return before time-out period as shown in step 1054. The button must act on this command by checking its internal structures insofar as it can to see if all is as it should be. If nothing seems out of order, there is no repair work to be done. Otherwise, anything that can be reinitialized will be, and in any case, the results of the operation are reported back to host system 10 and displayed in Step 1056.

The AGENT button initialization operation is shown in FIG. 10E beginning at step 1060. The initialization command must first verify, in step 1061, its authority level is correct and set at two by the presence of a valid and password-unlocked master button. Provided this is the case, in step 1062, the agent initialization function must locate a "blank" button on the bus. A blank button is defined as one which has pre-loaded operating instructions in its internal read only memory which are specific to the PNM/Postal authority application outlined in this patent.

As explained above, the operating instructions must also be of the type of button being initialized. That is, those instructions for a POSTAGE button are somewhat different than those for a SECURITY DEVICE button necessitated by the gross differences in their operating behaviors and functions. When a button, POSTAGE or SECURITY DEVICE type, receives an initialization command from the host system 10, it must first have instructions in it to tell it what initialization means and what should be performed to accomplish this. Thus, as discussed above, it is the button that initializes itself after receiving a command from host system 10, not the host system 10 directly writing in memory locations within the button. The architecture of the button is such that outside influences can not directly change its operating instructions or memory. The host system for the button can only issue commands as defined in a narrow set of criteria to the button to make it perform a task such as initialization, credit or debit operations and repair of damaged memory.

In Step 1063, the actual Initialize command is issued from host system 10 to button and response of completed or not must return before time-out period as shown in step 1064.

In Step 1066, the positive or negative outcome is displayed on host system 10 display screen to the agent. The newly formatted agent button may now be removed from its holder and distributed to its new agent owner. The internal layout of data in RAM for an agent (or master) button is depicted in FIG. 13.

Referring back to FIG. 10A, and for the sake of further discussion and understanding of this POSTMAKER button validation process, if a real-world situation presents itself where all three types of buttons: AGENT, MASTER and POSTAGE happen to be on the bus at the same time, the proper button is located by its response after a status query by the host system 10 running POSTMAKER. Furthermore, the POSTMAKER software has been designed in such a fashion that that button's physical position on the bus is not of importance. Once a button has been located and connected, its position on the bus could physically change with no effect to POSTMAKER. This flexibility lends a certain forgiveness to order of log on of Master or Agent and distinguishing between the two and also between POSTAGE buttons and the Master or Agent.

PREFERRED EMBODIMENT—PORTABLE PROCESSOR LAYOUT

Figure 11:
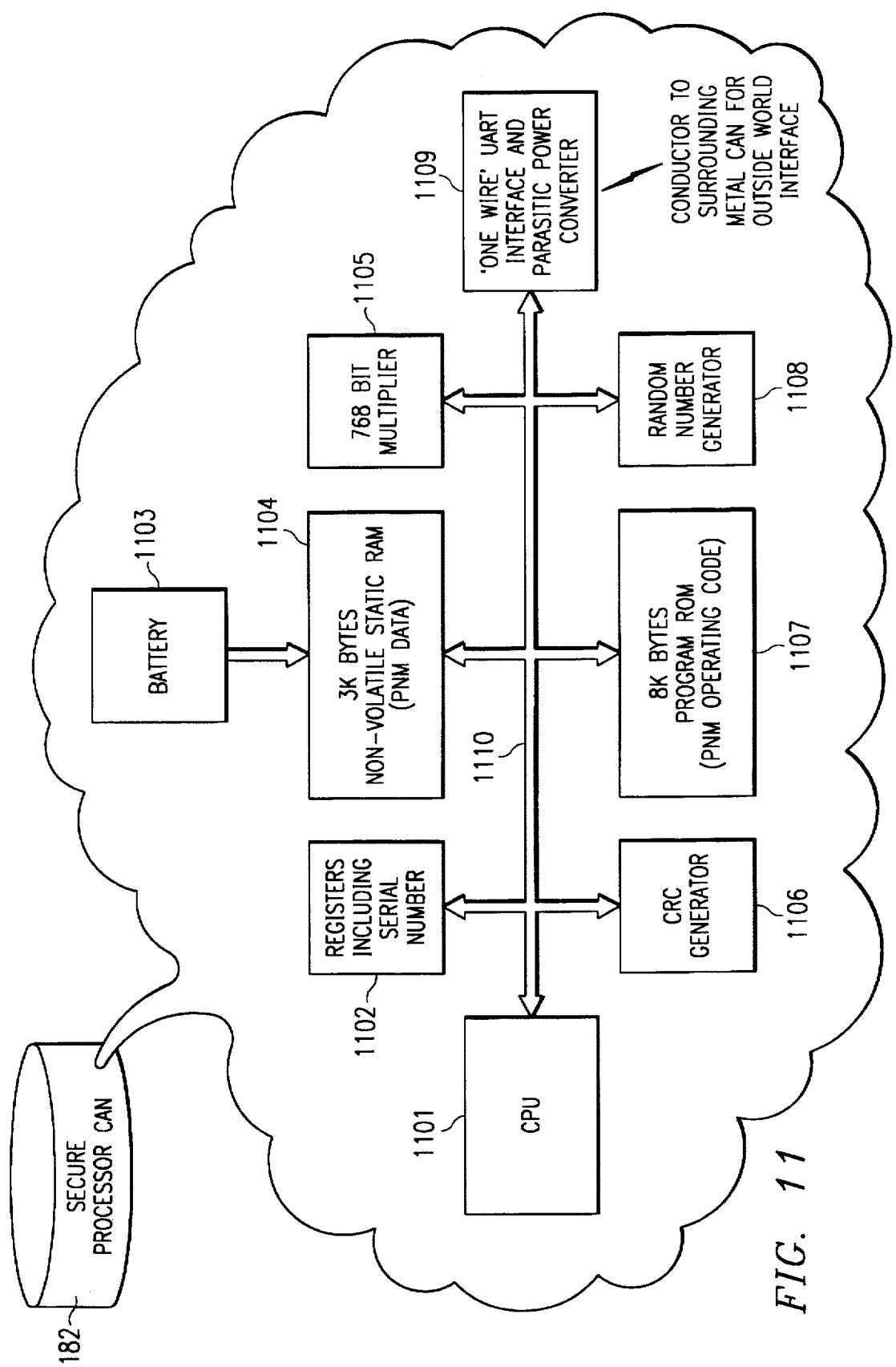
FIG. 11 illustrates the architecture for the preferred embodiment of the portable processor.

FIG. 11 depicts a functional layout of the Dallas Semiconductor "smart" button 182 which is the preferred embodiment of the portable postage dispensing device. The smart button is so called because of its button-like appearance and small size and built-in memory 1104, 1107 and processor (CPU) 1101. It is a microprocessor contained in a hermetically sealed metal can with several other "hybrid" components which make it even more useful in a secure environment.

Central processing unit (CPU) 1101 is a more efficient copy of the original 8051 microprocessor of Intel Corporation. Like most microprocessors, it executes instructions in sequence out of a memory, in this case, 8 Kbytes of read only memory (ROM) 1107. This sequence of instructions is sometimes known as a program or as operating code. Any process which has been programmed into a CPU will also require data to represent various control aspects of its task. Most of the data for the PNM postage dispensing devices is kept in the 3 Kbytes of random access memory (RAM) which are non-volatile. Semiconductor RAM loses its contents once power is removed from it, thus its volatile nature. Where this unique device draws its power from will be discussed herebelow. However, in order to not lose the contents of the RAM between uses of the button, a small battery 1103 with a life of 10 years is present.

Included is a set of registers 1102 for various uses as discussed herein. In addition to the normal registers which are part of the 8051-like architecture of the smart button, there are several other general purpose registers which provide such features as timed access to particularly sensitive RAM locations (such as the location of a cryptographic key). Another register is used for sequence checking of the operating code of the smart button. The use of this feature is in making sure that the code is executing in the proper sequence and has not somehow jumped out of its normal path of execution because of an anomaly of programming or due to tampering. Another register is a real-time clock which gives the button self-sufficiency in knowing what the current time is relative to its expiration date and also as an unimpeachable (in the sense that it can not easily be externally tampered with) source of date stamping for the postage indicia.

Several other special features have been added just for PNM use. There is a 768-bit multiplier circuit which can multiply two 768-bit operands in extremely high speed. The application of this is for the cryptographic chores which are necessary in secure communications between host system 10 and button 182. Another feature is random number generator 1108, also for cryptographic algorithm use. Another feature is a cyclic redundancy check (CRC) generator 1106 for use in communications to verify integrity of data received from the host system 10.

One feature, not specific to this system, but necessary all the same is a universal asynchronous receiver transmitter (UART) circuit 1109 for communication with the outside world. This UART makes contact with host systems via the metal case surrounding the smart button. This metal case must come in contact with an interface circuit bus which is ultimately connected to a host system 10 via means well known in the art. The UART takes care of the task of sending and receiving bytes of information and informing the CPU of its status.

Another function of this circuit is to take "parasitic" power from the host interface. This parasitic power is the voltage and current actually used to give the CPU and other circuitry the power it needs to function at high speed without the need to draw on the internal battery for anything but keeping the contents of the RAM and the realtime clock register live. Bus 1110 connects all of the internal devices together so that they can function as a unit. The manner in which the UART and parasitic power are arranged to interface with the outside world, through the metal can of the processor is unique and leads to increased usability for the entire device.

MEMORY LAYOUTS

FIG. 12 is the layout given to the 3K RAM in the preferred embodiment for a postage button. All registration identity, current balance and history logging data are stored in box 1201.

FIG. 13 is the layout given to the 3K RAM in the preferred embodiment for a security device button such as an agent or master. As can be seen by comparison with FIG. 12, the SECURITY DEVICE is a similar, but limited subset of the POSTAGE memory definitions. There is just enough data in box 1301 to identify its owner and to provide logging services in order to better know how various buttons are being used.

Figure 14:
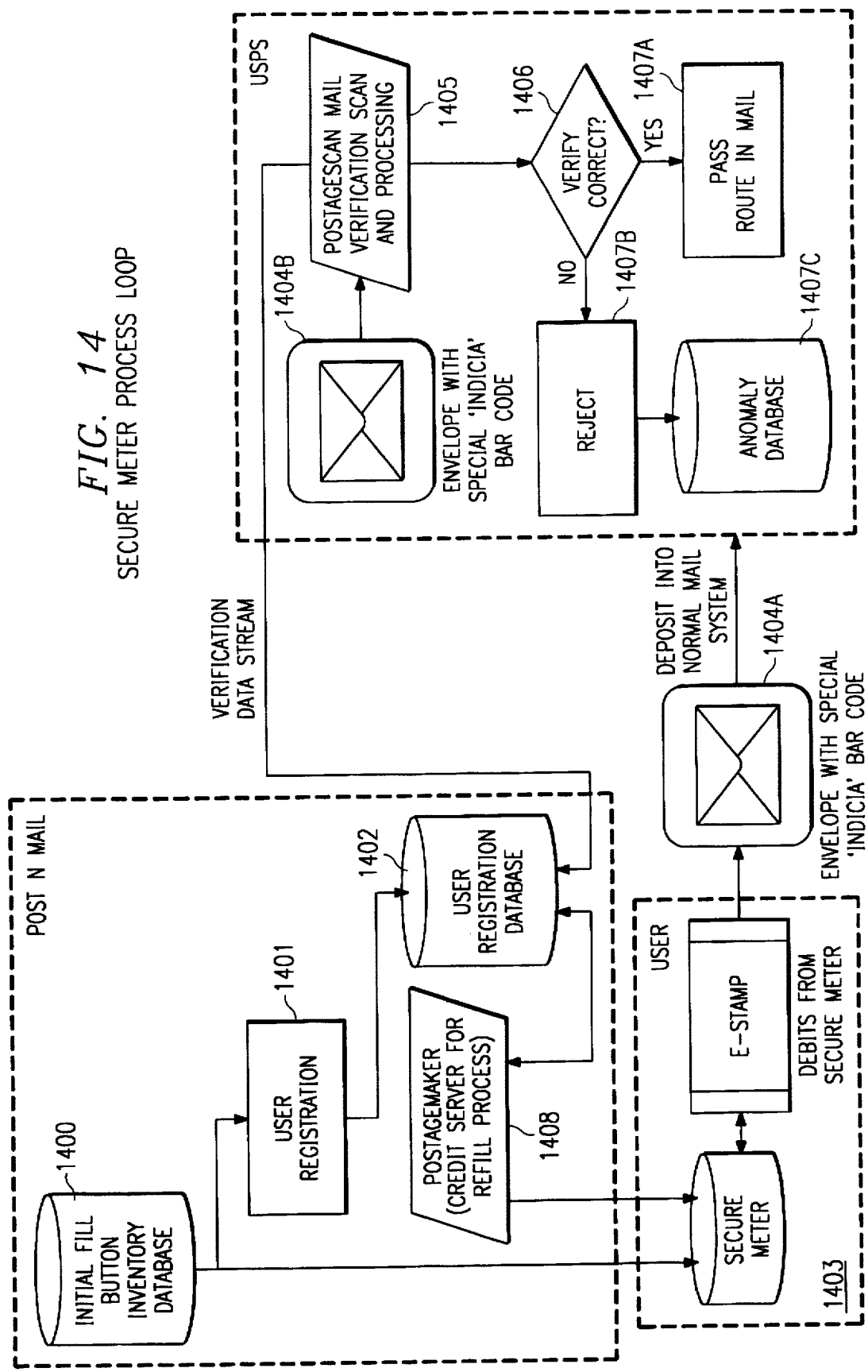
FIG. 14 shows the interrelationship of the database for registering memories assigned to users and the use of the database for verification purposes.

Referring now to FIG. 14, the process begins at Step 1400 where a button is initially created and given a small token value. The button creation is marked by its entry into an "Initial Fill Button Inventory Database" simultaneously with its inclusion in a shrink-wrapped package of software to be shipped to users of the verification system. Once a given software package, button included, has been obtained by a potential user, he/she must fill out an electronic user registration form whose present embodiment is that of a "Windows" program separate from the main program but included with it on the system installation disks. The registration program must be executed as part of the installation of the system before it can be used to issue postage. The process of the user filling out the form, sending it and the still-unregistered button back for registration to be scanned into the user registration database for registration is represented in Step 1401 and Step 1402. Also included in these steps is the removal of the button from the Initial Fill Button Inventory Database now that it is a valid registered postage dispensing device. In effect, the button, with its unique serial number, was moved from one inventory to another. Furthermore, as will be seen in future steps, the user registration database will be used for far more than just normal user registration of a software product.

In Step 1403, the user has received back his/her button, now fully registered and therefore legal to use in postage transactions. The user inserts the secure meter (button) in its interface receptacle and invokes the system control program on the PC. Once a letter has been produced, with a certain amount of postage, this amount of postage is deducted from the amount stored in the portable processor (memory) by way of commands from E-STAMP. The postal indicia with its encrypted form of user information, postage amount, date, strike counter and other information is printed on a label for sticking to an envelope or actually printed on an envelope. At this point, the mail object is entered into the mail system of the Postal Authority in Step 1401A.

In Step 1404B, the article of mail has been gathered and sent to a central processing facility. In Step 1405, the article of mail is scanned. The scan process first decodes the postal indicia using bar code scanning technology coupled with industrial automation toward the goal of validation of the pre-paid rights to send the article of mail. The system, in Step 1406, uses a series of criteria and checks to accomplish this. Examples of criteria include, (but are not limited to): 1) Just the fact that the indicia, which was encrypted in the secure environment of the portable postage dispensing device, can be decrypted gives a basic comfort level of validation; 2) Check against the central user database for validation of expiration date, expected balance of meter as of now and special flags for lost or stolen portable postage dispensers giving the capability to invalidate them much in the same way lost or stolen credit cards can be invalidated because of their validation against a central database.

If the article of mail passes, in Step 1407A, the mail is routed to its normal destination. However, if the article of mail does not pass one of the tests, it is rejected to Step 1407B where an entry is written in an Anomaly database 1407C of items to be investigated.

The refill, Step 1408, happens asynchronously to the rest of the steps, but is included, nevertheless, because of its contribution to the overall process loop. This is performed when a user has used most of the pre-paid credit on his/her meter (portable processor) and must return the portable processor to an authorized refill station, such as the Postal Authority. The preferred embodiments may include simply a host processor-based system used by one authorized agent to serve walk-up clients or an automated process whereby postage processor buttons are refill-processed in batches with little human interaction. In either case, the user provides his/her portable processor (memory) to the authorized agent, along with prepayment in the form of check, credit card or private account. The portable processor is credited with the prepayment amount using a PC which is executing to accomplish this in a secured and authorized environment. Once the portable processor has been credited, it is returned to the user, who can then continue to freely use the system to issue postage until the next time the portable processor must be refilled with pre-paid credits.

The other important contribution of the system is its updating of the central user database with information on renewed expiration date, user pre-paid balance, refilling station identification, etc. This information is invaluable in the validation Step 1406.

As discussed above, the process loop gives the benefits of accounting and auditability of pre-paid electronic postage to the adopting Postal Authority.

While the invention has been shown to work in conjunction with a postal indicia system, it should be understood that the indicia is simply a printed form of a data packet produced by the cooperative effort of the PC and the portable processor. The data packet contains information that can be used for look up purposes in the database. Thus, the data packet can serve to authenticate any data stream coming from the PC or can be to authenticate itself, thereby granting a user certain privileges, based upon the authentication. For example, the data packet could be associated with airline tickets, either in printed form or in electronic form. In either event, the data packet associated with the document to be checked is authenticated to prove the authenticity of the accompanying data. As noted, the "other" data can be printed (the data packet would then be printed and scanned into the system) or the "other" data could be electronic (the data packet could then be electronic and read directly).

The aforementioned E-STAMP and POSTMAKER programs have been shown and described with respect to a "Windows" operating environment on a PC. Of course, other means could be employed for implementing the present invention within a host processor-based system.

Although the present invention and its advantages have been described in detail, it should be understood that various changes, substitutions and alterations can be made herein without departing from the spirit and scope of the invention as defined by the appended claims.

What is claimed is:

1. A general purpose processor-based system operable for outputting data pertaining to a postage meter stamp to be printed on a piece of mail, said system comprising:

means for verifying that a universal storage means, programmed to contain a predetermined amount of postage that may be printed, is coupled to said system and is an authorized storage means, said means for verifying using data retrieved from said storage means; means for reading date information provided within said universal storage means;

means for retrieving a portion of an amount of postage contained within said verified storage means;

means for outputting data pertaining to said retrieved portion along with data operable for printing said postage meter stamp including an indication of said retrieved postage portion; and means operable prior to said outputting of data for displaying a graphical representation of said postage meter stamp including said retrieved portion of postage, wherein the postage meter stamp displayed is at least in part encoded by the general purpose processor-based system.

2. The system of claim 1, further comprising:

means for checking said date information to insure that a preestablished expiration date has not passed.

3. The system of claim 2, wherein said checking means is operable within said universal storage means.

4. The system of claim 3, wherein said checking means comprises:

means operable within said universal storage means for ascertaining a current date, said current date being used to compare to said expiration date by said checking means.

5. The system of claim 4, wherein said ascertaining means includes a realtime clock provided within said universal storage means which is unalterable by said system.

6. The system of claim 2, wherein said checking means comprises:

means for allowing said retrieving means to operate only upon a determination that said preestablished expiration date has not passed.

7. The system of claim 2, wherein said checking means is operable external to said universal storage means.

8. The system of claim 1, wherein said date information is provided within said universal storage means by an administrative processor-based system discrete from said general purpose processor-based system.

9. The system of claim 8, wherein said date information is a certain fixed period of time after a specified type of interaction has occurred between said universal storage means and said administrative processor-based system.

10. The system of claim 8, wherein said date information is also stored within a central user database discrete from said general purpose processor-based system, said administrative processor-based system, and said universal storage means.

11. The system of claim 10, wherein said date information is included in said data operable for printing said postage meter stamp to enable verification of said date by reference to said central user database.

12. The system of claim 1, wherein said date information is provided by a realtime clock within said universal storage means.

13. The system of claim 12, wherein said date information is utilized to adjust a date stamp of said postage meter stamp.

14. The system of claim 13 wherein said date information is utilized to prevent pre-dating and post-dating of said piece of mail.

15. The system of claim 12, wherein said date information is encrypted within said postage meter stamp.

16. The system of claim 1, wherein said displaying means comprises means for personalizing the displayed postage meter stamp.

17. The system of claim 1, further comprising:

means for checking said date information to insure that a preestablished expiration date has not passed, wherein said checking means is operable internally to said portable processor to check said date information and said checking means is operable external to said system to check said date information; and means for adjusting a date stamp of said postage meter stamp, wherein said date information is utilized to prevent pre-dating and post-dating of said piece of mail.

18. A method for printing a postage meter stamp on a piece of mail, said stamp including postage for mailing said piece of mail, said method comprising the steps of:

coupling a portable processor device to a general purpose processor-based system to provide data communication therebetween;

handshaking under control of an application program operable on said processor-based system with said portable processor device coupled to said processor-based system to read data including a serial number and a postage balance specific to said portable processor device;

verifying that said portable processor device is authorized for use in printing postage meter stamps according to said method, said verifying step including reference to said read serial number data;

reading date information specific to said portable processor device;

receiving in said processor-based system one or more parameters pertaining to mailing of said piece of mail;

determining a desired amount of postage for said piece of mail as a function of mailing parameters entered into said system and particular to said piece of mail;

deducting under joint control of said application and memory contained within said portable processor device said postage from said postage balance resulting in a new balance stored within said portable memory device; and printing said postage meter stamp including said postage on said piece of mail, said printing occurring on a general purpose printer connected to said processor-based system.

19. The method of claim 18, further comprising the step of:

checking said date information to determine that a pre-established expiration date has not passed.

20. The method of claim 19, wherein said checking step is performed under control of said portable processor device.

21. The method of claim 19, further comprising the step of:

allowing said deducting step to be performed only upon a determination that said preestablished expiration date has not passed.

22. The method of claim 18, wherein said date information is stored within said portable processor device by an administrative processor-based system, and wherein said date information is unalterable by said general purpose processor-based system.

23. The method of claim 22, wherein said date information establishes a certain fixed period of time after a specified type of interaction has occurred between said portable processor device and said administrative processor-based system.

24. The method of claim 22, wherein said date information is also stored within a database external to said general purpose processor-based system, said administrative processor-based system, and said universal storage means.

25. The method of claim 24, wherein said date information is included in said printed postage meter stamp to enable comparison of said date independent of said general purpose processor-based system and said portable processor device through reference to said database.

26. The method of claim 18, wherein said date information is provided by a realtime clock provided within said portable processor device.

27. The method of claim 26, wherein said date information is utilized to adjust a date stamp of said printed postage meter stamp.

28. The method of claim 27, wherein said date information is utilized to prevent pre-dating and post-dating of said piece of mail.

29. The method of claim 26, wherein said date information includes both a present date and a present time of day.

30. The method of claim 18, wherein said date information is encrypted within said printed postage meter stamp.

31. The method of claim 30, wherein encryption of said date information includes the use of a machine readable code said connected portable memory to create a data stream corresponding to a graphical security indicia having embedded therein a specific monetary value.

32. A system for printing a graphical security indicia utilizing a credit transferred from a portable processor of a plurality of portable processors, said system comprising:

means for temporarily connecting a portable processor from a pool of portable processors to a computing system having its own processor separate from said connected portable processor, wherein portable processors of said pool have been initialized as portable processors suitable for printing said graphical security indicia;

means for sending a data stream from said computing system to said connected portable processor, said data stream interacting with data previously stored unalterably within an authentic one of said pool of portable processors to produce a protocol internal to authentic ones of said pool of portable processors;

means operable within said connected portable processor for ascertaining an expiration date of said portable processor;

means for returning from authentic ones of said pool of portable processors under control of said produced protocol a data stream including a copy of at least a portion of said data unalterably stored within said connected portable processor; and means for generating, under control of said computing system and said returned encrypted data stream and in response to a determination that said expiration date has not transpired, a data stream for formulating said graphical security indicia adapted to be visibly observable at a location remote from said computing system and said portable processor.

33. The system of claim 32, wherein said determining means is operable within said connected portable processor and includes reference to a realtime clock operating within said connected portable processor, and wherein said realtime clock is not alterable by said computing system.

34. The system of claim 32, further comprising:

means operable only upon determination that said expiration date has not transpired for thereafter interchanging data between said computing system and said connected portable memory to create a data stream corresponding to a graphical security indicia having embedded therein a specific monetary value.

35. The system of claim 34, wherein said expiration date is included within said data stream corresponding to said graphical security indicia, said included expiration date to be printed with said graphical security indicia.

36. The system of claim 32, wherein said returned data stream includes said expiration date.

37. A system for printing a graphical security indicia utilizing a credit transferred from a portable processor of a plurality of portable processors, said system comprising:

means for temporarily connecting one portable processor of a pool of portable processors to a computing system having its own processor separate from said connected portable processor, said pool of portable processors including particular ones of said plurality of portable processors initialized for use in printing graphical security indicia;

means for sending a data stream from said computing system to said connected portable processor, said data stream interacting with data previously stored unalterably within an initialized one of said portable processors to produce a protocol internal to initialized ones of said portable processors; and means for returning from initialized ones of said portable processors under control of said produced protocol a data stream including a copy of at least a portion of said data unalterably stored within said portable processor and a date ascertained from within said portable processor, wherein said date provides a date stamp of said graphical security indicia, and wherein said date is utilized to prevent pre-dating and post-dating of said graphical security indicia.

38. The system of claim 37, wherein said date is provided by a realtime clock within said portable processor.

39. The system of claim 38, wherein said date includes both a present date and a present time of day.

40. The system of claim 37, wherein said date is included within said data stream corresponding to said graphical security indicia, said included date to be printed with said graphical security indicia.

41. The system of claim 40, wherein said printed date is encrypted in a machine readable code.

* * * * *